United States Patent
Shen et al.

(10) Patent No.: US 8,929,825 B2
(45) Date of Patent: Jan. 6, 2015

(54) METHOD FOR SENDING A SCAN RESPONSE BASED ON A MULTI-CARRIER SYSTEM, AND BASE STATION

(75) Inventors: Xiaoqin Shen, Shenzhen (CN); Hao Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 647 days.

(21) Appl. No.: 13/145,450

(22) PCT Filed: Oct. 23, 2009

(86) PCT No.: PCT/CN2009/074599
§ 371 (c)(1),
(2), (4) Date: Jul. 20, 2011

(87) PCT Pub. No.: WO2010/083694
PCT Pub. Date: Jul. 29, 2010

(65) Prior Publication Data
US 2012/0021792 A1 Jan. 26, 2012

(30) Foreign Application Priority Data
Jan. 22, 2009 (CN) .......................... 2009 1 0003978

(51) Int. Cl.
*H04B 1/00* (2006.01)
*H04L 5/00* (2006.01)
*H04W 36/00* (2009.01)
*H04W 24/00* (2009.01)

(52) U.S. Cl.
CPC .............. *H04L 5/0007* (2013.01); *H04W 24/00* (2013.01); *H04W 36/0083* (2013.01)
USPC .......................................... 455/63.1

(58) Field of Classification Search
CPC ......... H04W 24/00; H04W 24/10; H04B 3/46
USPC ........................................ 455/446, 436, 67.11
See application file for complete search history.

(56) References Cited

U.S. PATENT DOCUMENTS

| 2002/0022484 A1* | 2/2002 | Dickey ............................ 455/446 |
| 2002/0052201 A1* | 5/2002 | Wilhelmsson et al. ........ 455/434 |
| 2005/0101328 A1* | 5/2005 | Son et al. ........................ 455/436 |
| 2006/0003767 A1* | 1/2006 | Kim et al. ....................... 455/436 |
| 2008/0056195 A1* | 3/2008 | Lee et al. ....................... 370/331 |

(Continued)

FOREIGN PATENT DOCUMENTS

| CN | 1423915 A | 6/2003 |
| CN | 1794674 A | 6/2006 |

(Continued)

OTHER PUBLICATIONS

EP Communication cited in EP Application No. 09838661.8 dated Oct. 2, 2013, 9 pgs.

(Continued)

*Primary Examiner* — April G Gonzales
(74) *Attorney, Agent, or Firm* — Cooper Legal Group, LLC

(57) ABSTRACT

The present invention discloses a method for sending a scan response based on a multi-carrier system, and a base station, wherein the method comprises: a base station receives a scan request signaling sent by a terminal; and responding to the scan request signaling, the base station determines a carrier the terminal needs to scan and sends a scan response message to the terminal.

6 Claims, 11 Drawing Sheets

(56) References Cited

U.S. PATENT DOCUMENTS

| | | | | |
|---|---|---|---|---|
| 2008/0159235 | A1* | 7/2008 | Son et al. | 370/332 |
| 2008/0253336 | A1* | 10/2008 | Parkvall et al. | 370/335 |
| 2011/0255478 | A1* | 10/2011 | Shen et al. | 370/328 |
| 2012/0094664 | A1* | 4/2012 | Jung et al. | 455/434 |

FOREIGN PATENT DOCUMENTS

| | | | |
|---|---|---|---|
| CN | 1871796 | A | 11/2006 |
| CN | 1969479 | A | 5/2007 |
| CN | 101277145 | A | 10/2008 |
| JP | 2007504747 | A | 3/2007 |
| JP | 2007509527 | A | 4/2007 |
| JP | 200872291 | A | 3/2008 |
| JP | 2008535401 | A | 8/2008 |
| WO | 0167788 | A2 | 9/2001 |
| WO | 2008029700 | A1 | 3/2008 |
| WO | 2008056411 | A1 | 5/2008 |

OTHER PUBLICATIONS

"Updates for MOB_SCN-REQ/RSP/REP text", David Comstock, Jun. 26, 2008, reprinted from the Internet at: http://www.google.com/url?sa=t&rct=j&q=&esrc=s&frm=1&source=web&cd=2&ved=0CDAQFjAB&url=http%3A%2F%2Fgrouper.ieee.org%2Fgroups%2F%2F802%2F16%2Fmaint%2Fcontrib%2FC80216maint-08_277r1.pdf&ei=PpGfUvKjKcKmyQGfloCACg&usg=AFQjCNFCLTF6bLqP4spx7pGcfkfUONu19A&bvm=bv.57155469,d.aWc, 13 pgs.

International Search Report in international application No. PCT/CN2009/074599, mailed on Feb. 4, 2010, pp. 1-5.

English Translation of the Written Opinion of the International Search Authority in international application No. PCT/CN2009/074599, mailed on Feb. 4, 2010, pp. 1-4.

\* cited by examiner

METHOD FOR SENDING A SCAN RESPONSE BASED ON A MULTI-CARRIER SYSTEM, AND BASE STATION

TECHNICAL FIELD

The present invention relates to the field of communications, and more particularly, to a method for sending a scan response based on a multi-carrier system, and a base station.

BACKGROUND

In related technologies, in order to meet a high-efficiency requirement, the concept of multi-carrier is introduced in a system.

A base station can be configured with multiple carriers which may be classified into fully-configured carriers and partially-configured carriers, wherein a fully-configured carrier includes all necessary synchronous channels, control channels and other system side information, while a partially-configured carrier may only include data transport channels or some necessary control messages; compared with a fully-configured carrier, a partially-configured carrier may not include synchronous channels.

Carriers may be classified into main carriers and sub-carriers at a terminal side.

A main carrier, which must be a fully-configured carrier, is mainly used for control message interaction and/or data interaction between a base station and a terminal, and may be further used for service processing and physical (PHY for short) control information or media access control (MAC for short) information interaction; additionally, a main carrier may be further used for completing part terminal control functions such as network access. It should be noted that each terminal has only one main carrier in a cell.

A sub-carrier, which may be a fully-configured carrier or a partially-configured carrier, is an additional carrier for the service transmission of a terminal and is mainly used for data interaction. A sub-carrier may also include a control signaling supportive of multi-carrier operation. A terminal may have one or more sub-carriers or no sub-carrier.

In a mobile communication system, when a terminal moves to the edge of a base station, if the original serving base station is reduced in the signaling quality and thus incapable of continuing to provide services for the terminal, the terminal should be handed over to another base station to maintain the succession of the services, wherein such a handover is known as an inter-base station handover.

In a multi-carrier system, as a base station is provided with multiple carriers, when a carrier (serving carrier) being used by a terminal is over-loaded and thus the quality of service (QoS) is reduced, or when the signal intensity of a serving carrier is reduced and thus the terminal needs to search for a carrier of a better intensity, the terminal may be handed over to another carrier in the base station to perform data transmission, wherein such a handover is known as intra-base station handover.

In a single-carrier system, a base station broadcasts information of a neighbor cell (a cell neighboring to the current serving cell) via broadcast information to support a terminal to scan the neighbor cell, so that the terminal can measure the signal quality of the neighbor cell, wherein in the broadcast information, there is a base station identifier of the neighbor cell and other information. In a multi-carrier system, a base station may be configured with multiple carriers and can broadcast the multi-carrier information of the serving base station via broadcast information. When a serving carrier cannot provide good radio quality for a terminal, the terminal will send a scan request to the base station to request a scan on the carriers of the current serving base station or the carriers of a neighbor multi-carrier base station, however, currently there is no corresponding solution that a base station sends a scan response to a terminal. In addition, in the current technologies, when a terminal needs handover and the handover is triggered by a serving base station, there is no corresponding solution that the handover request signaling sent from the serving base station to the terminal includes the carriers the terminal needs to scan.

SUMMARY

Considering the problem that in the technologies related to a multi-carrier system, when a terminal sends a scan request signaling to a base station, there is no corresponding solution that the base station sends a scan response to the terminal, when the base station initiatively sends a handover request signaling to the terminal, there is no corresponding solution that the handover request signaling includes the carriers the terminal needs to scan, the present invention is proposed. The main purpose of the present invention is to provide an improved scan response sending solution based on a multi-carrier system so as to address at least one of the problems above.

In order to achieve the purpose above, according to an aspect of the present invention, there is provided a method for sending a scan response based on a multi-carrier system.

According to the present invention, the method for sending a scan response based on a multi-carrier system comprises: a base station receives a scan request signaling sent by a terminal; and responding to the scan request signaling, the base station determines a carrier the terminal needs to scan and sends a scan response message to the terminal.

Further, after the base station determines the carrier the terminal needs to scan, the method may further comprise: the base station sets configuration parameters of the carrier the terminal needs to scan, wherein the configuration parameters comprise at least one of: a carrier identifier, a carrier frequency and a carrier bandwidth; and the base station includes the configuration parameters in the scan response message so that the terminal performs a scan according to the configuration parameters.

Wherein, the process that the base station determines a carrier the terminal needs to scan may comprise: the base station determines the carrier the terminal needs to scan to be a carrier of the base station; or the base station determines the carrier the terminal needs to scan to be a carrier of a neighbor multi-carrier base station.

Preferably, the carrier the terminal needs to scan may be a fully-configured carrier.

Preferably, the scan response message may further include at least one of: whether or not a carrier corresponding to a carrier identifier included in the scan request signaling is recommended, and the number of the recommended carriers.

In order to achieve the purpose above, according to another aspect of the present invention, there is provided a method for sending a scan response based on a multi-carrier system.

According to the present invention, the method for sending a scan response based on a multi-carrier system comprises: a base station determines a carrier a terminal needs to scan and includes information of the carrier the terminal needs to scan in a handover request signaling and sends it to the terminal; and the terminal scans the carrier needing to be scanned according to the handover request signaling.

Wherein the process that the base station determines a carrier the terminal needs to scan may comprise: the base station determines the carrier the terminal needs to scan to be a carrier of the base station; or the base station determines the carrier the terminal needs to scan to be a carrier of a neighbor multi-carrier base station.

Preferably, the carrier the terminal needs to scan may be a fully-configured carrier.

In order to achieve the purpose above, according to a further aspect of the present invention, there is provided a base station.

According to the present invention, the base station comprises: a receiving module, used for receiving a scan request signaling sent by a terminal; a determining module, used for determining a carrier the terminal needs to scan, wherein the carrier the terminal needs to scan is a carrier of a base station or a carrier of a neighbor multi-carrier base station; and a sending module, used for sending a scan response message to the terminal after the determining module determines the carrier the terminal needs to scan.

In order to achieve the purpose above, according to a yet further aspect of the present invention, there is provided a base station.

According to the present invention, the base station comprises: a determining module, used for determining a carrier a terminal needs to scan, wherein the carrier the terminal needs to scan is a carrier of the base station or a carrier of a neighbor multi-carrier base station; and a sending module, used for including information of the carrier the terminal needs to scan in a handover request signaling and sending it to the terminal so that the terminal scans the carrier needing to be scanned according to the handover request signaling.

By means of the technical solution of the present invention, by setting a scan response message, in a multi-carrier system, when a terminal sends a scan request signaling to a base station, the base station can send a scan response message to the terminal, and when the base station initiatively sends a handover request signaling to the terminal, the terminal can also send a scan response message to the base station.

Other features and advantages of the present invention will be set forth in the following description, and in part will be apparent from the description, or may be learned by practice of the present invention. The object and other advantages of the present invention can be realized by and obtained from the structures especially illustrated in the specification, claims and the accompanying drawings.

BRIEF DESCRIPTION OF THE DRAWINGS

As a part of the specification, the following accompanying drawings are provided to make the present invention understood better and to explain the present invention in combination with embodiments of the present invention but not to limit the present invention. In the accompanying drawings.

DETAILED DESCRIPTION

Function Summary

In a multi-carrier system, when a terminal sends a scan request signaling to a base station, there is no corresponding solution that the base station sends a scan response to the terminal, when the base station initiatively sends a handover request signaling to the terminal, there is no corresponding solution that the handover request signaling includes the carriers the terminal needs to scan. On this ground, the present invention provides improved solutions for sending a scan response based on a multi-carrier system. In the technical solutions provided by the present invention, one solution is: a base station receives a scan request signaling sent by a terminal, response to the scan request signaling, determines a carrier the terminal needs to scan, and sends a scan response message to the terminal; another solution is: a base station determines a carrier a terminal needs to scan and includes information of the carrier the terminal needs to scan in a handover request signaling and sends it to the terminal, and the terminal scans the carrier needing to be scanned according to the handover request signaling.

The preferred embodiments of the present invention are illustrated below in combination with accompanying drawings, and it should be appreciated that the preferred embodiments herein are only provided for illustrating and explaining the present invention but not for limiting the present invention.

In the following description, for the purpose of explanation, multiple specific details are described to make the present invention understood thoroughly. However, it is apparent that the present invention can also be achieved without these specific details, and the following embodiments and the details described therein can be variously combined without departing from the scope illustrated by the appended claims.

Method Embodiment 1

Figure 1:
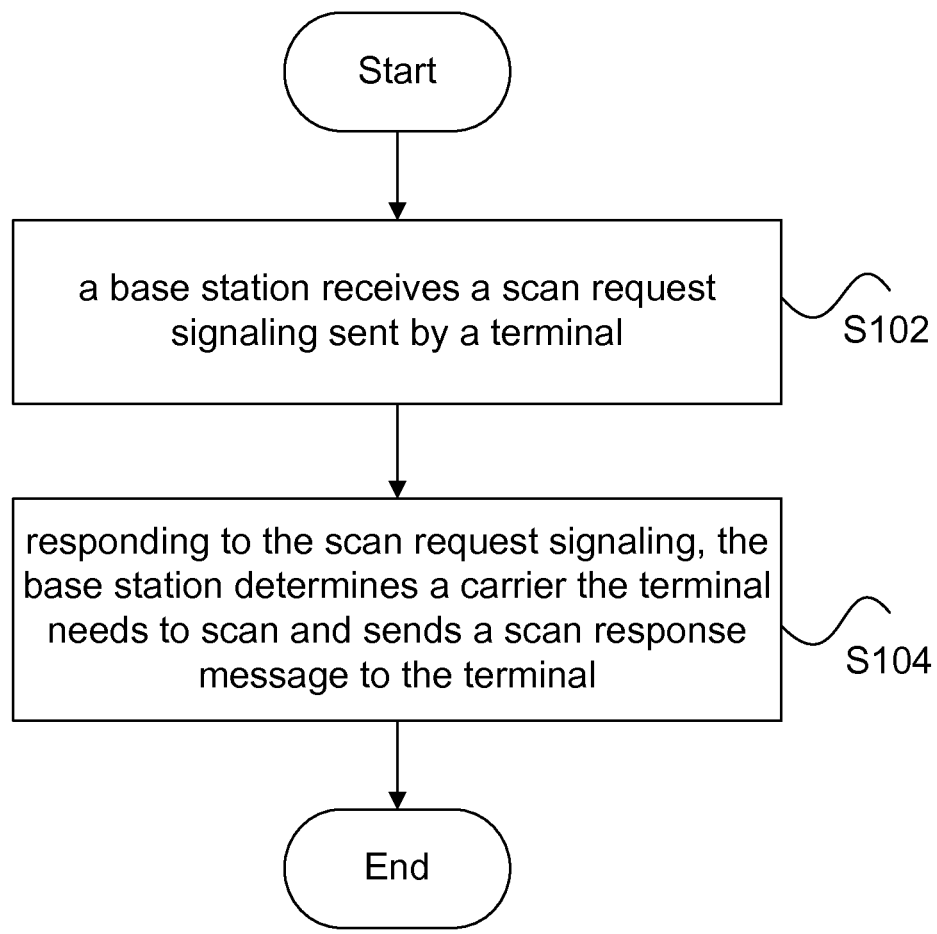
FIG. 1 is a flow chart of a method for sending a scan response based on a multi-carrier system according to method embodiment 1 of the present invention.

According to this embodiment, a method for sending a scan response based on a multi-carrier system is provided, FIG. 1 is a flow chart of a method for sending a scan response based on a multi-carrier system according to method embodiment 1 of the present invention, as shown in FIG. 1, the method comprises the following processing (S102-S104):

S102, a serving base station receives a scan request signaling sent by a terminal;

S104, responding to the scan request signaling, firstly the serving base station determines whether the terminal is capable of starting to scan a carrier of the serving base station or a carrier of a neighbor base station according to current state of the terminal (i.e. type of service the terminal is currently engaged in) and/or a scheduling algorithm used in the base station, and then determines a carrier the terminal needs to scan (namely, a recommended carrier) after determining that the terminal is capable of starting to scan the carrier of the serving base station or the carrier of the neighbor base station, it should be noted that the recommended carrier the terminal needs to scan may be a carrier of the serving base station or a carrier of the neighbor multi-carrier base station, and preferably the recommended carrier may be a fully-configured carrier.

After determining the recommended carrier, the serving base station further needs to set the configuration parameters of the recommended carrier, wherein the configuration parameters include, but not limited to, the following information: an identifier of the recommended carrier, a frequency of the recommended carrier and a bandwidth of the recommended carrier; then the serving base station may include the configuration parameters in the scan response message and send the scan response message to the terminal, so that the terminal can scan the serving base station or the neighbor base station according to the configuration parameters. In practical application, in addition to the identifier, the frequency and the bandwidth information of the recommended carrier, the scan response message further contains information about whether or not a carrier corresponding to the carrier identifier included in the scan request signaling is recommended, and the number of the recommended carriers.

The technical solution of method embodiment 1 of the present invention is illustrated below in combination with specific examples.

Example 1

Figure 2:
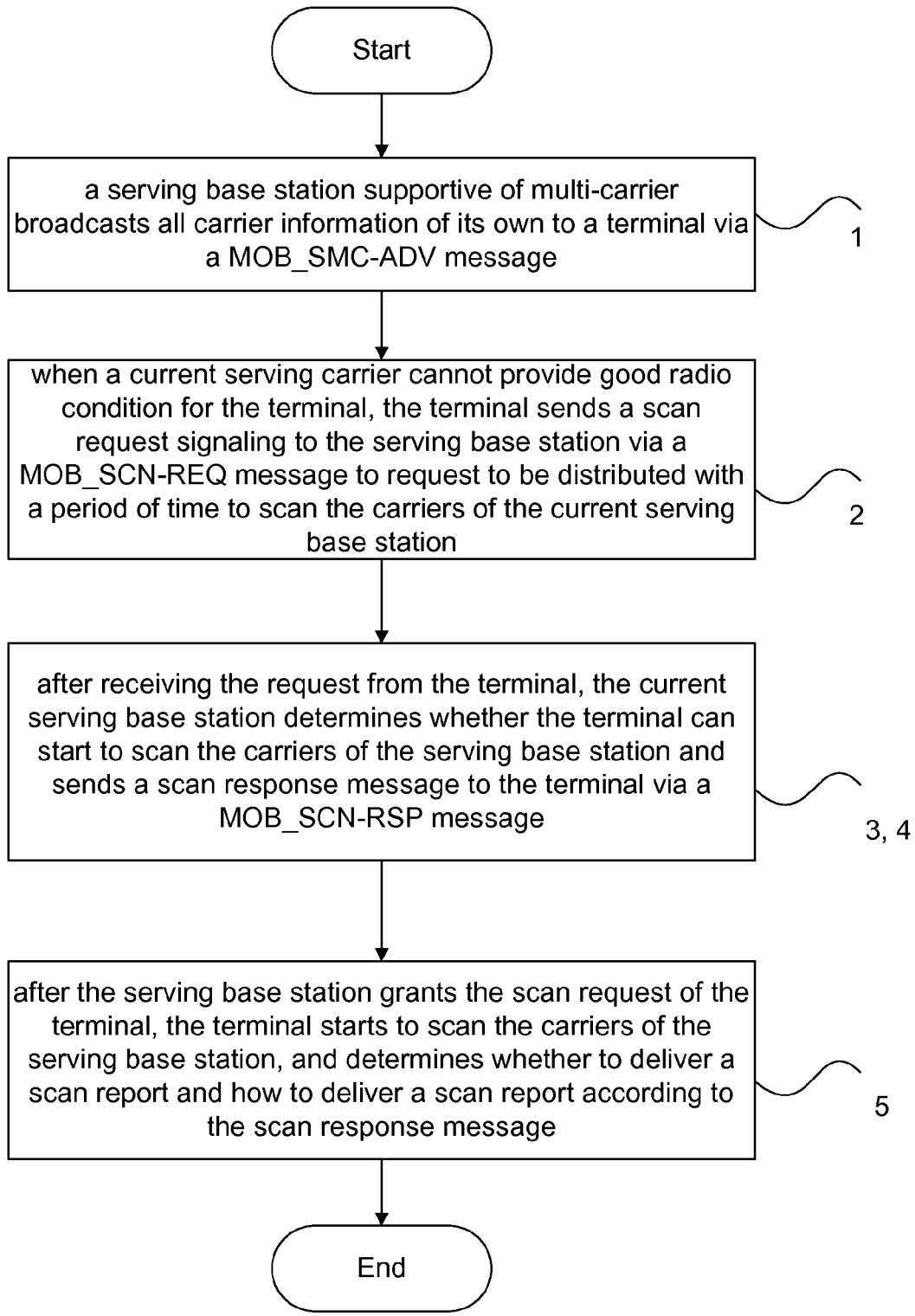
FIG. 2 is a flow chart of example 1 according to the method embodiment of the present invention.

In this example, carrier information of a serving base station (that is, all carrier information of the base station) is broadcasted to a terminal by the serving base station via a MOB_SMC-ADV message, a scan request signaling is sent to the serving base station by the terminal via a MOB_SCN-REQ message, and a scan response message is sent to the terminal by the serving base station via a MOB_SCN-RSP message. FIG. 2 is a flow chart of example 1 according to method embodiment 1 of the present invention, as show in FIG. 2, the method comprises the following processing.

1, a serving base station supportive of multi-carrier broadcasts all carrier information of its own to a terminal. Specifically, the multi-carrier information of the serving base station can be included in a MOB_SMC-ADV message which (i.e. the MOB_SMC-ADV message) is a new system message related to information of the carriers inside the serving base station, the MOB_SMC-ADV message may be broadcasted by the serving base station to the terminals in the serving areas of the serving base station via a broadcast channel. Table 1 shows the format of the MOB_SMC-ADV message supportive of multi-carrier, wherein the multi-carrier information in the message includes, but not limited to, the following parameters: the number of the carriers contained in a multi-carrier cell, a carrier identifier (SCID), a carrier frequency (SCF) and a carrier bandwidth (SCB).

Moreover, the following parameters should be added in the MOB_SMC-ADV message: 1, the number of the multi-carriers of the current serving base station (N_SCARRIERS); 2, a flag indicating whether a carrier is a fully-configured carrier (SFC flag); and 3, the number of the fully-configured carriers of the current serving base station (N_SFCARRIERS).

TABLE 1

| Syntax | Size (bit) | Notes |
|---|---|---|
| MOB_SMC-ADV_Message_format( ){ | — | — |
| Total Fragmentation | 4 | A total number of fragmentations |
| N_SCARRIERS | 8 | — |
| For (j = 0; j < N_SCARRIERS; j++){ | — | — |
| Length | 8 | An information length of all the vectors contained in an FOR loop |
| SFC flag | 1 | A carrier with an SFC flag of 1 is a fully-configured carrier, and a carrier with an SFC flag of 0 is a partially-configured carrier. |
| If (SFC flag==1){ | — | — |
| N_SFCRRIERS | 3 | — |
| For (j = 0; j < N_SFCARRIERS; j++){ | — | — |
| SCID | 8 | — |
| SCF | 8 | — |
| SCB | 8 | — |
| } | — | — |
| } | — | — |
| Else{ | | |
| SCID | 8 | — |
| SCF | 8 | — |
| SCB | 8 | — |
| } | — | — |
| } | — | — |
| } | — | — |

2, when a serving carrier cannot provide good radio condition for the terminal, the terminal sends a scan request signaling to the serving base station to request to be distributed with a period of scan time to scan the carriers of the current serving base station. Specifically, when desiring to send a scan request signaling to the serving base station for requesting a scan on the carriers of the base station, the terminal may include the scan request signaling in a MOB_SCN-REQ message for sending. Table 2 shows the format of the MOB_SCN-REQ message supportive of multi-carrier, as shown in Table 2, the following parameters is included in the MOB_SCN-REQ message: 1, a number index of the recommended carriers of the serving base station (N_Recommended_SMC_Index), wherein when the value of the N_Recommended_SMC_Index is equal to 0xFF, it is indicated that a bitmap index of the carriers of the serving base station (SMC_Bitmap_Index) is needed to identify the index of the carriers of the serving base station in the MOB_SMC-ADV message, and when the value of the N_Recommended_SMC_Index is not equal to 0xFF, the N_Recommended_SMC_Index represents the number of the recommended carriers in the MOB_SMC-ADV message; 2, the bitmap size of the carriers of the serving base station (SMC_Bitmap_Size), which is used for representing the size of the bitmap index of the fully-configured carriers of the serving base station; 3, the bitmap index of the carriers of the serving base station (SMC_Bitmap_Index), which is used for representing the bitmap index of the fully-configured carriers of the serving base station; and 4, an index of the carriers of the serving base station (SMC_BS_Index), which is used for representing the position index of the carriers of the serving base station in the MOB_SMC-ADV message (corresponding to S102 shown in FIG. 1).

TABLE 2

| Syntax | Size (bit) | Notes |
|---|---|---|
| ... | ... | ... |
| Scan Iteration | 8 | — |
| N_Recommended_SMC_Index | 8 | When its value is not equal to 0xFF, the N_Recommended SMC_Index represents the number of the recommended carriers in the MOB_SMC-ADV message, and when its value is equal to 0xFF, SMC-Bitmap_Index is used to identify the carrier index of the serving base station in the MOB_SMC-ADV message. |
| If(N_Recommended_SMC-Index != 0){ | — | — |
| Configuration Change Count for MOB_NBR-ADV message | 8 | |
| } | — | — |
| If(N_Recommended_SMC-Index == 0xFF){ | — | — |
| Reserved | 1 | 0 is also possible. |
| Req_Seq_Num | 1 | A one-bit sequence number of a message associated with each new message. |
| SMC_Bitmap_Size | 6 | A size is smaller than or equal to the number of the carriers of the serving base station in the MOB_SMC-ADV message. |
| SMC_Bitmap_Index | (SMC_Bitmap_Size + 1) × 4 | 0: a corresponding multi-carrier is not requested. 1: a corresponding multi-carrier is requested. |
| for( each '1' in Nbr_Bitmap_Index){ | — | — |
| Reserved | 1 | 0 is also possible. |
| Scanning_type | 1 | 0b000: uncorrelated scan; 0b001: layer 0 correlated scan; 0b010: layer 1 correlated scan; 0b011: layer 2 correlated scan; 0b100-0b111: Reserved |
| } | — | — |
| }else{ for(j = 0; j < N_Recommended_SMC_Index; j++){ | — | — |
| SMC_BS_Index | 8 | An index of the corresponding position of a carrier of the serving base station in the MOB_SMC-ADV message |
| Req_Seq_Num | 1 | A one-bit sequence number of a message associated with each new message. |
| Scanning_type | 1 | 0b000: uncorrelated scan; 0b001: layer 0 correlated scan; 0b010: layer 1 correlated scan; 0b011: layer 2 correlated scan; 0b100-0b111: Reserved |
| } } | — | — |
| N_Recommended_BS_Index | 8 | When its value is not equal to 0xFF, the N_Recommended_BS_Index represents the number of the recommended base stations in the MOB_NBR-ADV message, and when its value is equal to 0xFF, BS_Bitmap_Index is used to identify the base station index in the MOB_NBR-ADV message. |
| ... | ... | ... |
| } | — | — |

3, after receiving the MOB_SCN-REQ message including the scan request signaling from the terminal, the serving base station determines whether the terminal can start to scan the carriers of the serving base station according to the service the terminal is currently engaged in and/or the scheduling algorithm used in the base station. Specifically, if the serving base station authorizes the terminal with a scan interval (that is, scan duration) as long as the requested time, the terminal can start to scan the carriers of the serving base station, and if the serving base station distributes the terminal with a scan duration of 0, it is indicated that the serving base station declines the carrier scan request of the terminal.

4, when the serving base station has determined that the terminal can start to scan the carriers of the serving base, it sends a scan response message to the terminal (corresponding to S104 shown in FIG. 1). Specifically, the scan response message sent by the serving base station to the terminal may be contained in a MOB_SCN-RSP message which can be sent via a basic connection identifier (BASIC CID). Table 3 shows the format of the MOB_SCN-RSP message supportive of multi-carrier, and as shown in Table 3, the following parameters is added in this message: 1, Use_SMC_Bitmap_Index, which indicates whether or not the carrier index bitmap in the MOB_SMC-ADV message is used; 2, Use_ReqSMC_Bitmap_Index, which indicates whether or not the carrier index bitmap in the MOB_SCN-REQ message is used; 3, a configuration change count for the MOB_SMC-ADV message (Configuration change count for MOB_SMC-ADV); 4, a size of the bitmap index in the MOB_SMC-ADV message (SMC_Bitmap_Size); 5, SMC_Bitmap_Index, which indicates whether or not a corresponding carrier in the MOB_SCN-REQ message is recommended; 6, the number of the recommended carriers (N_Recommended_SMC_Index); 7, a carrier index in the MOB_SMC-ADV message (SMC_Index); 8, the number of the recommended serving carriers using a 48-bit identifier (ID) (N_Recommended_SMC_Full); and 9, a recommended carrier ID (Recommended SMC ID).

TABLE 3

| Syntax | Size (bit) | Notes |
| --- | --- | --- |
| MOB_SCN-RSP_Message_format( ){ | — | — |
| ... | ... | ... |
| Rsp_Seq_Num | 1 | — |
| Use_SMC_Bitmap_Index | 8 | 0: a carrier index bitmap in the MOB_SMC-ADV message is not used. 1: a carrier index bitmap in the MOB_SMC-ADV message is used. |
| Use_ReqSMC_Bitmap_Index | 8 | 0: a carrier index bitmap in the MOB_SCN-REQ message is not used. 1: a carrier index bitmap in the MOB_SCN-REQ message is used. |
| Use_Nbr_Bitmap_Index | 1 | — |
| ... | ... | ... |
| if (Scan Duration != 0) { | — | — |
| ... | ... | ... |
| Scan iteration | 8 | — |
| If( Use_SMC_Bitmap_Index == 1){ | — | — |
| Configuration change count for MOB_SMC-ADV | 8 | — |
| SMC_Bitmap_Size | 6 | |
| SMC_Bitmap_Index | 8 | 0: a corresponding carrier is not used. 1: a corresponding carrier is used. |
| for( each '1' in SMC_Bitmap_Index){ | — | — |
| ... | ... | ... |
| }else{ | — | — |
| N_Recommended_SMC_Index | 8 | A carrier list in the MOB_SMC-ADV message is scanned when the N_Recommended_SMC_Index is 0. |
| If(N_Recommended_SMC_Index != 0){ | — | — |
| Configuration change count for MOB_SMC-ADV | 8 | — |
| } | | |
| for(j = 0; j < N_Recommended_SMC_Index; j++){ | — | — |
| SMC_Index | 8 | |
| ... | ... | ... |
| } | — | — |
| If( Use_ReqSMC_Bitmap_Index == 1){ | — | — |
| ... | ... | ... |
| } | — | — |
| N_Recommended_SMC_Full | 8 | |
| for(j = 0; j < N_Recommended_SMC_Full; j++){ | — | — |
| Recommended SMC ID | 48 | |
| ... | ... | ... |
| } | — | — |
| } | — | — |
| if (Scan Duration != 0) { | — | — |
| ... | ... | ... |
| } | — | — |
| } | — | — |
| Padding | — | — |
| ... | ... | ... |
| } | — | — |

5, the terminal receives the scan response message sent by the serving base station via the MOB_SCN-RSP message, starts to scan the carriers of the serving base station, and determines whether to deliver a scan report and how to deliver a scan report according to the scan response message.

It can be seen from the processing above that the base station can make a response to the request signaling of the terminal for a scan on multi-carriers of the base station by sending the scan response message to the terminal via the MOB_SCN-RSP message.

Example 2

Figure 3:
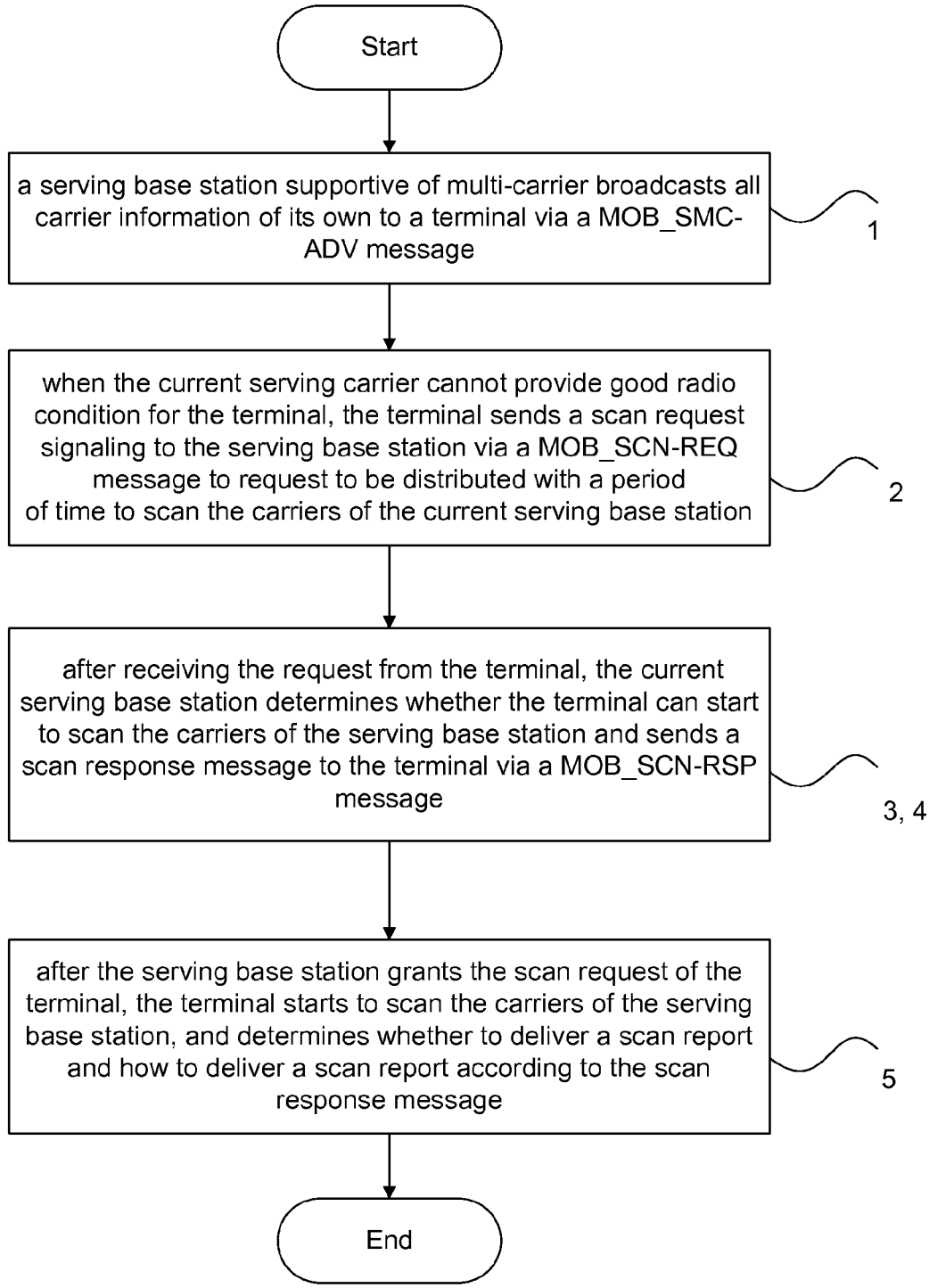
FIG. 3 is a flow chart of example 2 according to the method embodiment of the present invention.

In this example, carrier information of a serving base station (that is, all carrier information of the base station) is broadcasted to a terminal by the serving base station via a MOB_SMC-ADV message, a scan request signaling is sent to the serving base station by the terminal via an MOB_SMC-REQ message, and a scan response message is sent to the terminal by the serving base station via an MOB_SMC-RSP message. FIG. 3 is a flow chart of example 2 according to the method embodiment 1 of the present invention, as show in FIG. 3, the method comprises the following processing.

1, a serving base station supportive of multi-carrier broadcasts all carrier information of its own to a terminal. Specifically, the multi-carrier information of the serving base station can be included in a MOB_SMC-ADV message which (i.e. the MOB_SMC-ADV message) is a new system message that is related to information of the carriers inside the serving base station, the MOB_SMC-ADV message may be broadcasted by the serving base station to the terminals in the serving areas of the serving base station via a broadcast channel. The format of the MOB_SMC-ADV message supportive of multiple carriers can be referred to Table 1, wherein the multi-carrier information in the message includes, but not limited to, the following parameters: the number of the carriers contained in a multi-carrier cell, a carrier identifier (SCID), a carrier frequency (SCF) and a carrier bandwidth (SCB).

Moreover, the following parameters may be added in the MOB_SMC-ADV message: 1, the number of the multi-carriers of the current serving base station (N_SCARRIERS); 2, a flag indicating whether a carrier is a fully-configured carrier (SFC flag); and 3, the number of the fully-configured carriers of the current serving base station (N_SFCARRIERS).

2, when the current serving carrier cannot provide good radio condition for the terminal, the terminal sends a scan request signaling to the serving base station to request to be distributed with a period of time to scan the carriers of the current serving base station. Specifically, when desiring to send a scan request signaling to the serving base station for requesting a scan on the carriers of the base station, the terminal may send the scan request via an MOB_SMC-REQ message, to request to be distributed with a scan interval, a scan estimation time or a recommended start frame. The MOB_SMC-REQ message supportive of multi-carrier is a new message and its format is shown in Table 4; as shown in Table 4, the following parameters is included in the MOB_SMC-REQ message: 1, Scan duration; 2, Interleaving interval; 3, Scan Iteration; 4, the number index of the recommended carriers of the serving base station (N_Recommended_SMC_Index), wherein when the value of the N_Recommended_SMC_Index is equal to 0xFF, it is indicated that a bitmap index of the carriers of the serving base station (SMC_Bitmap_Index) is needed to identify the carrier index of the serving base station in the MOB_SMC-ADV message, and when the value of the N_Recommended_SMC_Index is not equal to 0xFF, it is indicated that the number of the recommended carriers in the MOB_SMC-ADV message is recommended; 5, the bitmap size of the carriers of the serving base station (SMC_Bitmap_Size), which is used for representing the size of the bitmap index of the fully-configured carriers of the serving base station; 6, the bitmap index of the carriers of the serving base station (SMC_Bitmap_Index), which is used for representing the bitmap index of the fully-configured carriers of the serving base station; and 7, the index of the carriers of the serving base station (SMC_BS_Index), which is used for representing the position index of the carriers of the serving base station in the MOB_SMC-ADV message (corresponding to S102 shown in FIG. 1).

TABLE 4

| Syntax | Size (bit) | Notes |
| --- | --- | --- |
| MOB_SMC-ADV_Message_format( ){ | — | — |
| Scan duration | 8 | — |
| Interleaving interval | 8 | — |
| Scan Iteration | 8 | — |
| N_Recommended_SMC_Index | 8 | When its value is not equal to 0xFF, the N_Recommended_SMC_Index represents the number of the recommended carriers in the MOB_SMC-ADV message, and when its value is equal to 0xFF, SMC-Bitmap_Index is used to identify the carrier index of the serving base station in the MOB_SMC-ADV message. |
| If(N_Recommended_SMC_Index!= 0){ | | |
| Configuration Change Count for MOB_SMC-ADV message | 8 | |
| } | — | — |
| If(N_Recommended_SMC-Index== 0xFF){ | — | — |
| Reserved | 1 | 0 is also possible. |
| Req_Seq_Num | 1 | A one-bit sequence number of a message associated with each new message. |

TABLE 4-continued

| Syntax | Size (bit) | Notes |
|---|---|---|
| SMC_Bitmap_Size | 6 | The size is smaller than or equal to the number of the carriers of the serving base station in the MOB_SMC-ADV message. |
| SMC_Bitmap_Index | (SMC_Bitmap_Size + 1) × 4 | 0: a corresponding multi-carrier is not requested. 1: a corresponding multi-carrier is requested. |
| for( each '1' in Nbr_Bitmap_Index){ | — | — |
| Reserved | 1 | 0 is also possible. |
| Scanning_type | 1 | 0b000: uncorrelated scan; 0b001: layer 0 correlated scan; 0b010: layer 1 correlated scan; 0b011: layer 2 correlated scan; 0b100-0b111: Reserved. |
| } | — | — |
| }else{ | — | — |
| for(j = 0; j < N_Recommended_SMC_Index; j++){ | — | — |
| SMC_BS_Index | 8 | An index of the corresponding positions of the carriers of the serving base station in the MOB_SMC-ADV message. |
| Req_Seq_Num | 1 | A one-bit sequence number of a message associated with each new message. |
| Scanning_type | 1 | 0b000: uncorrelated scan; 0b001: layer 0 correlated scan; 0b010: layer 1 correlated scan; 0b011: layer 2 correlated scan; 0b100-0b111: Reserved. |
| } | — | — |
| } | — | — |
| } | — | — |

3, after receiving the MOB_SMC-REQ message including the scan request signaling from the terminal, the current serving base station determines whether the terminal can start to scan the carriers of the serving base station according to the service the terminal is currently engaged in and/or the scheduling algorithm used in the base station. Specifically, if the serving base station authorizes the terminal with a scan interval (that is, scan duration) as long as the requested time, the terminal can start to scan the carriers of the serving base station, and if the serving base station distributes the terminal with a scan duration of 0, it is indicated that the serving base station declines the carrier scan request of the terminal.

4, when the serving base station has determined that the terminal can start to scan the carriers of the serving base, it sends a scan response message to the terminal (corresponding to S104 shown in FIG. 1). Specifically, the multi-carrier scan request response sent by the serving base station to the terminal may be contained in a new message MOB_SMC-RSP which is sent via a BASIC CID. Table 5 shows the format of the MOB_SMC-RSP message supportive of multi-carrier, and as shown in Table 5, the following parameters is added in this message: 1, Scan duration; 2, Report mode; 3, Report period; 4, Report metric; 5, scanning type (Scannning_type); 6, Use_SMC_Bitmap_Index, which indicates whether or not the carrier index bitmap in the MOB_SMC-ADV message is used; 7, Use_ReqSMC_Bitmap_Index, which indicates whether or not the carrier index bitmap in the MOB_SCN-REQ message is used; 8, a configuration change count for the MOB_SMC-ADV message (Configuration change count for MOB_SMC-ADV); 9, the size of the bitmap index in the MOB_SMC-ADV message (SMC_Bitmap_Size); 10, SMC_Bitmap_Index, which indicates whether or not a corresponding carrier is recommended; 11, the number of the recommended carriers (N_Recommended_SMC_Index); 12, a carrier index in the MOB_SMC-ADV message (SMC_Index); 13, the number of the recommended serving carriers using a 48-bit identifier (ID) (N_Recommended_SMC_Full); and 14, a recommended carrier ID (Recommended SMC ID).

TABLE 5

| Syntax | Size (bit) | Notes |
|---|---|---|
| MOB_SMC-RSP_Message_format( ){ | — | — |
| Scan duration | 8 | — |
| Report mode | 2 | 0b00: no report; 0b01: periodic report; 0b10: event-triggered report; 0b11: single scan. |
| Rsp_Seq_Num | 1 | — |
| Use_SMC_Bitmap_Index | 8 | 0: a carrier index bitmap in the MOB_SMC-ADV message is not used. 1: a carrier index bitmap in the MOB_SMC-ADV message is used. |

TABLE 5-continued

| Syntax | Size (bit) | Notes |
| --- | --- | --- |
| Use_ReqSMC_Bitmap_Index | 8 | 0: a carrier index bitmap in the MOB_SCN-REQ message is not used. 1: a carrier index bitmap in the MOB_SCN-REQ message is used. |
| Report period | 1 | "Report period" is meaningful when "Report mode" is 0b01 and 0b11, otherwise, "Report period" is 0. |
| Report metric | 8 | Which one of the following metrics a start is based on: Bit 0: SMC CINR mean; Bit 1: SMC RSSI mean; Bit 2: Relative Delay; Bit 3: SMC RTD, measured only between a serving carrier and a reporting terminal; and Bits 4-7: Reserved and are set to be 0. |
| if (Scan Duration != 0) { | — | — |
| Start frame | 8 | — |
| Interleaving interval | 8 | |
| Scan Iteration | 8 | — |
| If( Use_SMC_Bitmap_Index == 1){ | — | — |
| Configuration change count for MOB_SMC-ADV | 8 | — |
| SMC_Bitmap_Size | 6 | |
| SMC_Bitmap_Index | 8 | 0: a Corresponding carrier is not used. 1: a corresponding carrier is used. |
| for( each '1' in SMC_Bitmap_Index){ | — | — |
| Scanning_type | 3 | 0b001: a scan with an association level of 0; 0b010: a scan with an association level of 1; 0b011: a scan with an association level of 2; 0b100-0b111: reserved. |
| ... | ... | ... |
| }else{ | — | — |
| N_Recommended_SMC_Index | 8 | A carrier list in the MOB_SMC-ADV message is scanned when the N_Recommended_SMC_Index is 0. |
| If(N_Recommended_SMC_Index != 0){ | — | — |
| Configuration change count for MOB_SMC-ADV } | 8 | — |
| for(j = 0; j < N_Recommended_SMC_Index; j++){ | — | — |
| SMC_Index | 8 | |
| ... | ... | ... |
| } | — | — |
| If( Use_ReqSMC_Bitmap_Index == 1){ | — | — |
| ... | ... | ... |
| } | — | — |
| N_Recommended_SMC_Full | 8 | |
| for(j = 0; j < N_Recommended_SMC_Full; j++){ | — | — |
| Recommended SMC ID | 48 | |
| ... | ... | ... |
| TLV encoded information } | — | — |

5, the terminal receives the scan response message sent by the base station via the MOB_SMC-RSP message, starts to scan the carriers of the serving base station, and determines whether to deliver a scan report and how to deliver a scan report according to the scan response message.

It can be seen from the processing above that the base station can make a response to the request signaling of the terminal for a scan on multi-carriers of the base station by sending the scan response message to the terminal via the MOB_SMC-RSP message.

Example 3

Figure 4:
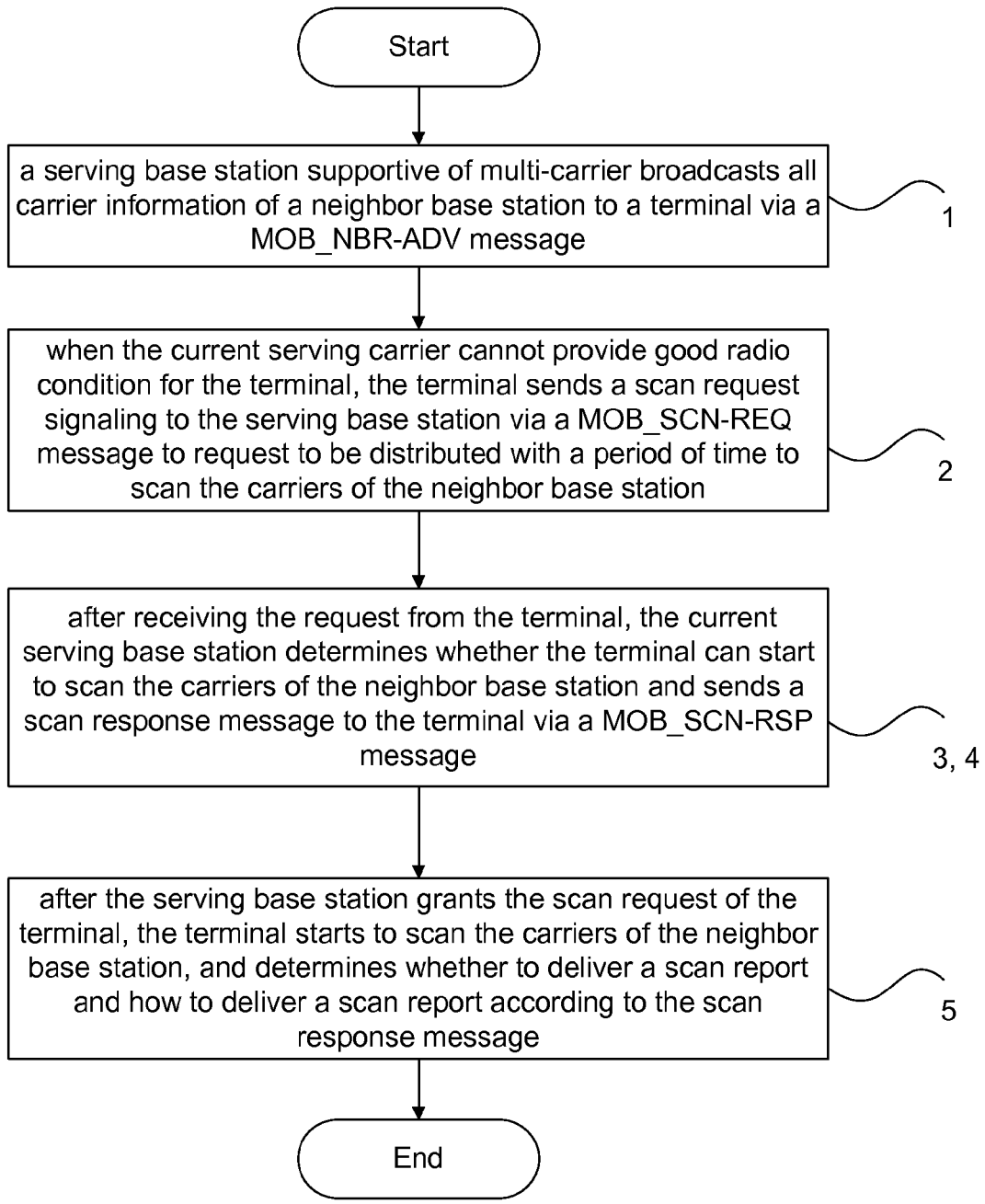
FIG. 4 is a flow chart of example 3 according to the method embodiment of the present invention.

In this example, carrier information of a neighbor base station is broadcasted to a terminal by a serving base station via an MOB_NBR-ADV message, a scan request signaling is sent to the serving base station by the terminal via an MOB_SCN-REQ message, and a scan response message is sent to the terminal by the serving base station via an MOB_SCN-RSP message. FIG. 4 is a flow chart of example 3 according to the method embodiment 1 of the present invention, as show in FIG. 4, the method comprises the following processing.

1, a serving base station supportive of multi-carrier broadcasts all carrier information of a neighbor base station (i.e. the aforementioned multi-carrier information) to a terminal. Specifically, the multi-carrier information of the neighbor base station is included in a MOB_NBR-ADV message. Table 6 shows the format of the MOB_NBR-ADV message supportive of multi-carrier, and as shown in Table 6, the multi-carrier information in the MOB_NBR-ADV message includes, but not limited to, the following parameters: an identifier of the neighbor base station, a leading index/sub-channel index, an indicator indicating whether an address is shared, a time and frequency synchronization indicator, whether a carrier is a fully-configured carrier, the number of the carriers contained in a multi-carrier cell, a carrier identifier (SCID), a carrier frequency (SCF), a carrier bandwidth (SCB) and the like.

TABLE 6

| Syntax | Size (bit) | Notes |
|---|---|---|
| ... | ... | ... |
| N_NEIGHBORS | 8 | — |
| For (j = 0; j < N_NEIGHBORS; j++){ | — | — |
| Length | 8 | An information length of all the vectors contained in an FOR loop. |
| N_CARRIERS | 3 | — |
| For (j = 0; j < N_CARRIERS; j++){ | — | — |
| FC flag | 1 | A carrier with an FC flag of 1 is a fully-configured carrier, and a carrier with an FC flag of 0 is a partially-configured carrier. |
| FID | — | — |
| FF | — | — |
| FB | — | — |
| } | — | — |
| ... | ... | ... |
| } | — | — |
| ... | ... | ... |

2, when the serving carrier cannot provide good radio condition for the terminal, the terminal sends a scan request signaling to the serving base station to request to be distributed with a period of scan time to scan the carriers of the neighbor base station. Specifically, when desiring to send a scan request signaling to the serving base station for requesting a scan on the carriers of the neighbor base station, the terminal may include the scan request signaling in an MOB_SCN-REQ message for sending. Table 7 shows the format of the MOB_SCN-REQ message supportive of multi-carrier, as shown in Table 7, the following parameters is included in the MOB_SCN-REQ message: 1, a number index of the recommended carriers of the neighbor base station (N_Recommended_SMC_Index), wherein when the value of the N_Recommended_SMC_Index is equal to 0xFF, it is indicated that a bitmap index of the carriers of the neighbor base station (SMC_Bitmap_Index) is needed to identify the index of the carriers of the neighbor base station in the MOB_NBR-ADV message, and when the value of the N_Recommended_SMC_Index is not equal to 0xFF, the N_Recommended_SMC_Index represents the number of the recommended carriers in the MOB_NBR-ADV message; 2, the bitmap size of the carriers of the neighbor base station (SMC_Bitmap_Size), which is used for representing the size of the bitmap index of the fully-configured carriers of the neighbor base station; 3, the bitmap index of the carriers of the neighbor base station (SMC_Bitmap_Index), which is used for representing the bitmap index of the fully-configured carriers of the neighbor base station; and 4, an index of the carriers of the neighbor base station (SMC_BS_Index), which is used for representing the position index of the carriers of the neighbor index in the MOB_NBR-ADV message.

TABLE 7

| Syntax | Size (bit) | Notes |
|---|---|---|
| ... | ... | ... |
| Scan Iteration | 8 | — |
| N_Recommended_SMC_Index | 8 | When its value is not equal to 0xFF, the N_Recommended_SMC_Index represents the number of the recommended carriers in the MOB_NBR-ADV message, and when its value is equal to 0xFF, SMC-Bitmap_Index is used to identify the carrier index of the serving base station in the MOB_NBR-ADV message. |
| If(N_Recommended_SMC_Index != 0){ | | |
| Configuration Change Count for MOB_NBR-ADV message | 8 | |
| } | — | — |
| If(N_Recommended_SMC_Index== 0xFF){ | — | — |
| Reserved | 1 | 0 is also possible. |
| Req_Seq_Num | 1 | A one-bit sequence number of a message associated with each new message. |
| SMC_Bitmap_Size | 6 | The size is smaller than or equal to the number of the carriers of the serving base station in the MOB_NBR-ADV message. |
| SMC_Bitmap_Index | (SMC_Bitmap_Size + 1) × 4 | 0: a corresponding multi-carrier is not requested. 1: a corresponding multi-carrier is requested. |
| for( each '1' in Nbr_Bitmap_Index){ | — | — |
| Reserved | 1 | 0 is also possible. |
| Scanning_type | 1 | 0b000: uncorrelated scan; 0b001: layer 0 correlated scan; 0b010: layer 1 correlated scan; 0b011: layer 2 correlated scan; 0b100-0b111: Reserved. |

TABLE 7-continued

| Syntax | Size (bit) | Notes |
|---|---|---|
| } | — | — |
| }else{ | — | — |
| for(j = 0; j < N_Recommended_SMC_Index; j++){ | — | — |
| SMC_BS_Index | 8 | An index of the corresponding positions of the carriers of the serving base station in the MOB_NBR-ADV message. |
| Req_Seq_Num | 1 | A one-bit sequence number of a message associated with each new message. |
| Scanning_type | 1 | 0b000: uncorrelated scan; 0b001: layer 0 correlated scan; 0b010: layer 1 correlated scan; 0b011: layer 2 correlated scan; 0b100-0b111: Reserved. |
| } | — | — |
| } | — | — |
| N_Recommended_BS_Index | 8 | When its value is not equal to 0xFF, the N_Recommended BS_Index represents the number of the recommended base stations in the MOB_NBR-ADV message, and when its value is equal to 0xFF, BS_Bitmap_Index is used to identify the base station index in the MOB_NBR-ADV message. |
| . . . | . . . | . . . |
| } | — | — |

3, after receiving the MOB_SCN-REQ message including the scan request signaling from the terminal, the serving base station determines whether the terminal can start to scan the carriers of the neighbor serving base station according to the service the terminal is currently engaged in and/or the scheduling algorithm used in the base station. Specifically, if the serving base station authorizes the terminal with a scan interval (that is, scan duration) as long as the requested time, the terminal can start to scan the carriers of the neighbor base station, and if the serving base station distributes the terminal with a scan duration of 0, then it is indicated that the serving base station declines the carrier scan request of the terminal.

4, when the serving base station has determined that the terminal can start to scan the carriers of the neighbor base station, it sends a scan response message to the terminal (corresponding to S104 shown in FIG. 1). Specifically, the scan response message sent by the serving base station to the terminal may be contained in a MOB_SCN-RSP message which is sent via a basic connection identifier (BASIC CID).

Table 8 shows the format of the MOB_SCN-RSP message supportive of multi-carrier, and as shown in Table 8, the following parameters is be added in this message: 1, Use_SMC_Bitmap_Index, which indicates whether or not the carrier index bitmap in the MOB_NBR-ADV message is used; 2, Use_ReqSMC_Bitmap_Index, which indicates whether or not the carrier index bitmap in the MOB_SCN-REQ message is used; 3, a configuration change count for the MOB_NBR-ADV message (Configuration change count for MOB_SMC-ADV); 4, a size of the bitmap index in the MOB_NBR-ADV (SMC_Bitmap_Size); 5, SMC_Bitmap_Index, which indicates whether or not a corresponding carrier in the MOB_SCN-REQ message is recommended; 6, the number of the recommended carriers (N_Recommended_SMC_Index); 7, a carrier index in the MOB_NBR-ADV message (SMC_Index); 8, the number of the recommended serving carriers using a 48-bit identifier (ID) (N_Recommended_SMC_Full); and 9, a recommended carrier ID (Recommended SMC ID).

TABLE 8

| Syntax | Size (bit) | Notes |
|---|---|---|
| MOB_SCN-RSP_Message_format( ){ | — | — |
| . . . | . . . | . . . |
| Rsp_Seq_Num | 1 | — |
| Use_SMC_Bitmap_Index | 8 | 0: a carrier index bitmap in the MOB_NBR-ADV message is not used. 1: a carrier index bitmap in the MOB_NBR-ADV message is used. |
| Use_ReqSMC_Bitmap_Index | 8 | 0: a carrier index bitmap in the MOB_SCN-REQ message is not used. 1: a carrier index bitmap in the MOB_SCN-REQ message is used. |
| Use_Nbr_Bitmap_Index | 1 | — |
| . . . | . . . | . . . |
| if (Scan Duration != 0) { | — | — |
| . . . | . . . | . . . |
| Scan iteration | 8 | — |

TABLE 8-continued

| Syntax | Size (bit) | Notes |
|---|---|---|
| If( Use_SMC_Bitmap_Index == 1){ | | — |
| Configuration change count for MOB_SMC-ADV | 8 | — |
| SMC_Bitmap_Size | 6 | |
| SMC_Bitmap_Index | 8 | 0: a corresponding carrier is not used. 1: a corresponding carrier is used. |
| for( each '1' in SMC_Bitmap_Index){ | | — |
| ... | ... | ... |
| }else{ | | — |
| N_Recommended_SMC_Index | 8 | A carrier list in the MOB_NBR-ADV message is scanned when the N_Recommended_SMC_Index is 0. |
| If(N_Recommended_SMC_Index != 0){ | | — |
| Configuration change count for MOB_SMC-ADV } | 8 | — |
| for(j = 0; j < N_Recommended_SMC_Index; j++){ | | — |
| SMC_Index | 8 | |
| ... | ... | ... |
| } | — | — |
| If( Use_ReqSMC_Bitmap_Index == 1){ | — | — |
| ... | ... | ... |
| } | — | — |
| N_Recommended_SMC_Full | 8 | — |
| for(j = 0; j < N_Recommended_SMC_Full; j++){ | — | — |
| Recommended SMC ID | 48 | |
| ... | ... | ... |
| } | — | — |
| } | — | — |
| if (Scan Duration != 0) { | — | — |
| ... | ... | ... |
| } | — | — |
| } | — | — |
| Padding | — | — |
| ... | ... | ... |
| } | — | — |

5, the terminal receives the scan response message sent by the serving base station via the MOB_SCN-RSP message, starts to scan the carriers of the neighbor base station, and determines whether to deliver a scan report and how to deliver a scan report according to the scan response message.

It can be seen from the processing above that the base station can make a response to the request signaling of the terminal for a scan on multi-carriers of the neighbor base station by sending the scan response message to the terminal via the MOB_SCN-RSP message.

Example 4

Figure 5:
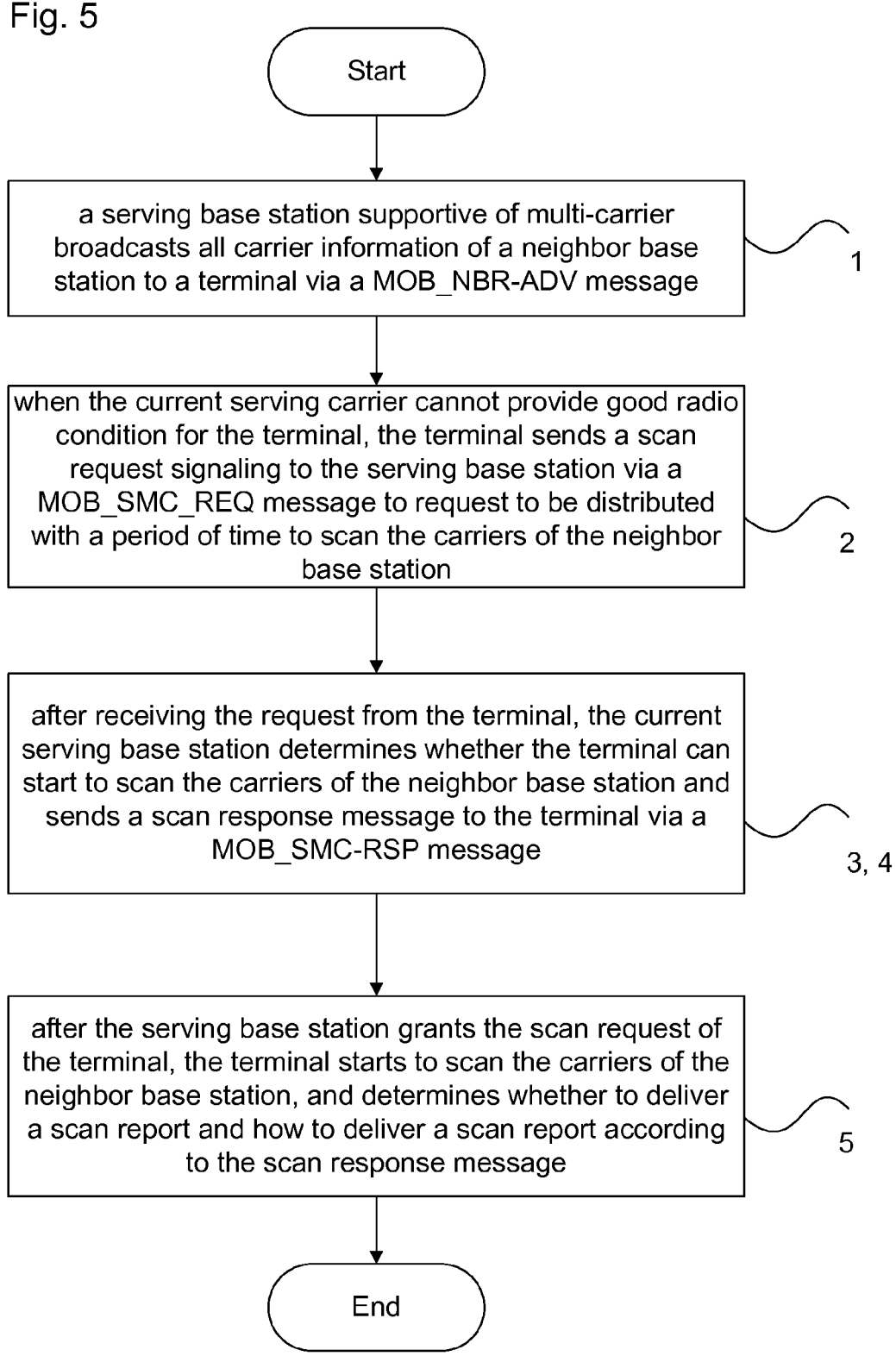
FIG. 5 is a flow chart of example 4 according to the method embodiment of the present invention.

In this example, carrier information of a neighbor base station is broadcasted to a terminal by a serving base station via a MOB_NBR-ADV message, a scan request signaling is sent to the serving base station by the terminal via a MOB_SMC-REQ message, and a scan response message is sent to the terminal by the serving base station via a MOB_SMC-RSP message. FIG. 5 is a flow chart of example 4 according to the method embodiment 1 of the present invention, as show in FIG. 5, the method comprises the following processing.

1, a serving base station supportive of multi-carrier broadcasts all carrier information of a neighbor base station (i.e. the aforementioned multi-carrier information) to a terminal. Specifically, the multi-carrier information of the neighbor base station is included in an MOB_NBR-ADV message. Table 6 shows the format of the MOB_NBR-ADV message supportive of multi-carrier, as shown table 6, the multi-carrier information in the MOB_NBR-ADV message includes, but not limited to, the following parameters: an identifier of the neighbor base station, a leading index/sub-channel index, an indicator indicating whether an address is shared, a time and frequency synchronization indicator, whether a carrier is a fully-configured carrier, the number of the carriers contained in a multi-carrier cell, a carrier identifier (SCID), a carrier frequency (SCF), a carrier bandwidth (SCB) and the like.

2, when the current serving carrier cannot provide good radio condition for the terminal, the terminal sends a scan request signaling to the serving base station to request to be distributed with a period of time to scan the carriers of the neighbor base station. Specifically, when desiring to send a scan request signaling to the serving base station for requesting a scan on the carriers of the neighbor base station, the terminal may send the scan request via a newly MOB_SMC-REQ message to request to be distributed with a scan internal, a scan estimation time or a recommended start frame. The MOB_SMC-REQ message supportive of multi-carrier is a new message and its format is shown in Table 9; as shown in Table 9, the following parameters is included in the MOB_SMC-REQ message: 1, Scan duration; 2, Interleaving interval; 3, Scan iteration; 4, the number index of the recommended carriers of the neighbor base station (N_Recommended_SMC_Index), wherein when the value of the N_Recommended_SMC_Index is equal to 0xFF, it is indicated that a bitmap index of the carriers of the neighbor base station (SMC_Bitmap_Index) is needed to identify the carrier index of the neighborbase station in the MOB_NBR-ADV message, and when the value of the N_Recommended_SMC_Index is not equal to 0xFF, it is indicated that the number of the recommended carriers in the MOB_NBR-ADV message is recommended; 5, the bitmap size of the carriers of the neighbor base station (SMC_Bitmap_Size), which is used for representing the size of the bitmap index of the fully-configured carriers of the neighbor base station; 6, the bitmap index of the carriers of the neighbor base station (SMC_Bitmap_Index), which is used for representing the bitmap index of the fully-configured carriers of the neighbor base station; and 7, an index of the carriers of the neighbor base station (SMC_BS_Index), which is used for representing the position index of the carriers of the neighbor base station in the MOB_NBR-ADV message.

TABLE 9

| Syntax | Size (bit) | Notes |
|---|---|---|
| MOB_SMC-ADV_Message_format( ){ | — | — |
| Scan duration | 8 | — |
| Interleaving interval | 8 | — |
| Scan Iteration | 8 | — |
| N_Recommended_SMC_Index | 8 | When its value is not equal to 0xFF, the N_Recommended SMC_Index represents the number of the recommended carriers in the MOB_NBR-ADV message, and when its value is equal to 0xFF, SMC-Bitmap_Index is used to identify the carrier index of the neighbor base station in the MOB_NBR-ADV message. |
| If(N_Recommended_SMC_Index != 0){ | | |
| Configuration Change Count for MOB_SMC-ADV message | 8 | |
| } | — | — |
| If(N_Recommended_SMC-Index== 0xFF){ | — | — |
| Reserved | 1 | 0 is also possible. |
| Req_Seq_Num | 1 | A one-bit sequence number of a message associated with each new message. |
| SMC_Bitmap_Size | 6 | The size is smaller than or equal to the number of the carriers of the neighbor base station in the MOB_NBR-ADV message. |
| SMC_Bitmap_Index | (SMC_Bitmap_Size + 1) × 4 | 0: a corresponding multi-carrier is not requested. 1: a corresponding multi-carrier is requested. |
| for( each '1' in Nbr_Bitmap_Index){ | — | — |
| Reserved | 1 | 0 is also possible. |
| Scanning_type | 1 | 0b000: uncorrelated scan; 0b001: layer 0 correlated scan; 0b010: layer 1 correlated scan; 0b011: layer 2 correlated scan; 0b100-0b111: Reserved. |
| } | — | — |
| }else{ | — | — |
| for(j = 0; j < N_Recommended_SMC_Index; j++){ | — | — |
| SMC_BS_Index | 8 | An index of the corresponding positions of the carriers of the serving base station in the MOB_NBR-ADV message. |
| Req_Seq_Num | 1 | A one-bit sequence number of a message associated with each new message. |
| Scanning_type | 1 | 0b000: uncorrelated scan; 0b001: layer 0 correlated scan; 0b010: layer 1 correlated scan; 0b011: layer 2 correlated scan; |

TABLE 9-continued

| Syntax | Size (bit) | Notes |
|---|---|---|
| | | 0b100-0b111: reserved. |
| } | — | — |
| } | — | — |
| } | — | — |

3, after receiving the MOB_SMC-REQ message including the scan request signaling from the terminal, the current serving base station determines whether the terminal can start to scan the carriers of the neighbor base station according to the service the terminal is currently engaged in and/or the scheduling algorithm used in the base station. Specifically, if the serving base station authorizes the terminal with a scan interval (that is, scan duration) as long as the requested time, the terminal can start to scan the carriers of the neighbor base station, and if the serving base station distributes the terminal with a scan duration of 0, it is indicated that the serving base station declines the carrier scan request of the terminal.

4, when the serving base station has determined that the terminal can start to scan the carriers of the neighbor base station, it sends a scan response message to the terminal (corresponding to S104 shown in FIG. 1). Specifically, the multi-carrier scan request response sent by the serving base station to the terminal may be contained in a new message MOB_SMC-RSP which is sent via a BASIC CID. Table 10 shows the format of the MOB_SMC-RSP message supportive of multi-carrier, and as shown in Table 10, the following parameters is added in this message: 1, Scan duration; 2, Report mode; 3, Report period; 4, Report metric; 5, scanning type (Scanning_type); 6, Use_SMC_Bitmap_Index, which indicates whether or not the carrier index bitmap in the MOB_NBR-ADV message is used; 7, Use_ReqSMC_Bitmap_Index, which indicates whether or not the carrier index bitmap in the MOB_SMC-REQ message is used; 8, a configuration change count for the MOB_NBR-ADV message (Configuration change count for MOB_SMC-ADV); 9, a size of the bitmap index in the MOB_NBR-ADV message (SMC_Bitmap_Size); 10, SMC_Bitmap_Index, which indicates whether or not a corresponding carrier is recommended; 11, the number of the recommended carriers (N_Recommended_SMC_Index); 12, a carrier index in the MOB_NBR-ADV message (SMC_Index); 13, the number of the recommended carriers using a 48-bit identifier (ID) (N_Recommended_SMC_Full); and 14, a recommended carrier ID (Recommended SMC ID).

TABLE 10

| Syntax | Size (bit) | Notes |
|---|---|---|
| MOB_SMC-RSP_Message_format( ){ | — | — |
| Scan duration | 8 | — |
| Report mode | 2 | 0b00: no report; 0b01: periodic report; 0b10: event-triggered report; 0b11: single scan. |
| Rsp_Seq_Num | 1 | — |
| Use_SMC_Bitmap_Index | 8 | 0: a carrier index bitmap in the MOB_NBR-ADV message is not used. 1: a carrier index bitmap in the MOB_NBR-ADV message is used. |
| Use_ReqSMC_Bitmap_Index | 8 | 0: a carrier index bitmap in the MOB_SMC-REQ message is not used. 1: a carrier index bitmap in the MOB_SMC-REQ message is used. |
| Report period | 1 | "Report period" is meaningful when "Report mode" is 0b01 and 0b11, otherwise, "Report period" is 0. |
| Report metric | 8 | Which one of the following metrics a start is based on: Bit 0: SMC CINR mean; Bit 1: SMC RSSI mean; Bit 2: Relative Delay; Bit 3: SMC RTD, measured only between a serving carrier and a reporting terminal; Bits 4-7: Reserved and are set to be 0. |
| if (Scan Duration != 0) { | — | — |
| Start frame | 8 | — |
| Interleaving interval | 8 | — |
| Scan Iteration | 8 | — |
| If( Use_SMC_Bitmap_Index == 1){ | | |
| Configuration change count for MOB_SMC-ADV | 8 | — |
| SMC_Bitmap_Size | 6 | |
| SMC_Bitmap_Index | 8 | 0: a corresponding carrier is not used. 1: a corresponding carrier is used. |
| for( each '1' in SMC_Bitmap_Index){ | — | |
| Scanning_type | 3 | 0b001: scan with an association level of 0; 0b010: scan with an association level of 1; 0b011: scan with an association level of 2; 0b100-0b111: reserved. |

TABLE 10-continued

| Syntax | Size (bit) | Notes |
| --- | --- | --- |
| ... | ... | ... |
| }else{ | — | — |
| N_Recommended_SMC_Index | 8 | A carrier list in the MOB_NBR-ADV message is scanned when the N_Recommended_SMC_Index is 0. |
| If(N_Recommended_SMC_Index != 0){ | — | — |
| Configuration change count for MOB_SMC-ADV } | 8 | — |
| for(j = 0; j < N_Recommended_SMC_Index; j++){ | — | — |
| SMC_Index | 8 | — |
| ... | ... | ... |
| } | — | — |
| If( Use_ReqSMC_Bitmap_Index == 1){ | — | — |
| ... | ... | ... |
| } | — | — |
| N_Recommended_SMC_Full | 8 | — |
| for(j = 0; j < N_Recommended_SMC_Full; j++){ | — | — |
| Recommended SMC ID | 48 | — |
| ... | ... | ... |
| TLV encoded information } | — | — |

5, the terminal receives the scan response message sent by the base station via the MOB_SMC-RSP message, starts to scan the carriers of the neighbor base station, and determines whether to deliver a scan report and how to deliver a scan report according to the scan response message.

It can be seen from the processing above that the base station can make a response to the request signaling of the terminal for a scan on multi-carriers of the neighbor base station by sending the scan response message to the terminal via the MOB_SMC-RSP message.

Method Embodiment 2

Figure 6:
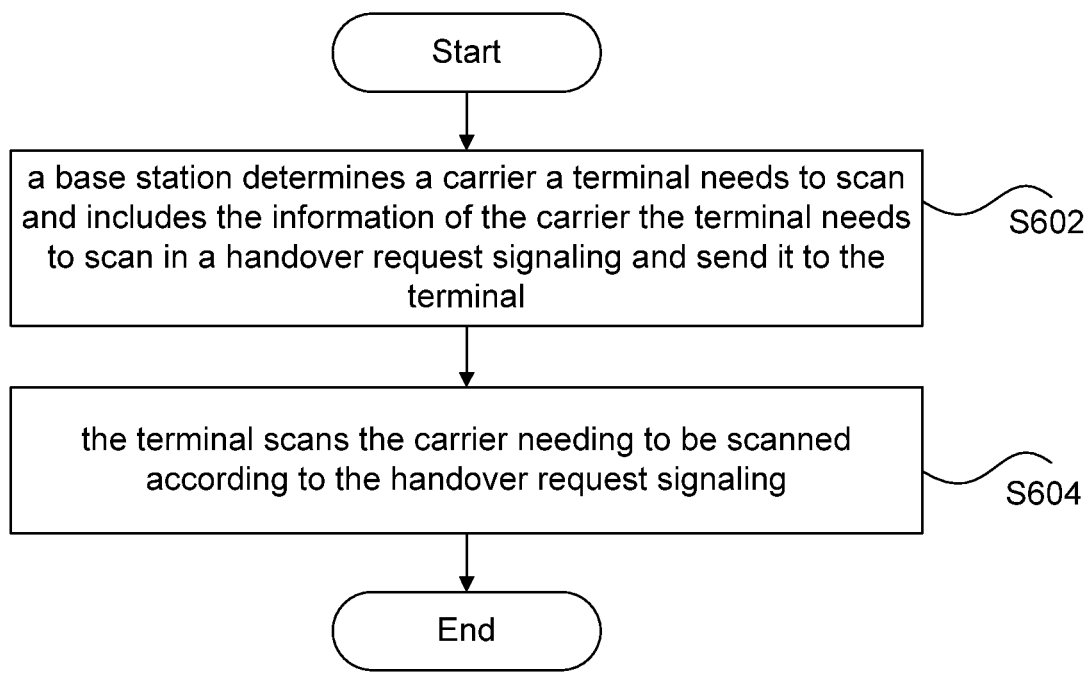
FIG. 6 is a flow chart of a method for sending a scan response based on a multi-carrier system according to method embodiment 2 of the present invention.

According to this embodiment, there is provided a method for sending a scan response based on a multi-carrier system. FIG. 6 is a flow chart of a method for sending a scan response based on a multi-carrier system according to method embodiment 2 of the present invention, as shown in FIG. 6, the method comprises the following processing (S602-S604):

S602, when a base station determines that a predetermined handover condition is met, it determines a carrier a terminal needs to scan and includes the information of the carrier the terminal needs to scan in a handover request signaling and then sends it to the terminal.

Specifically, the carrier the terminal needs to scan may be a carrier of the base station or a carrier of a neighbor multi-carrier base station, and preferably the recommended carrier may be a fully-configured carrier.

and S604, the terminal scans the carrier needing to be scanned according to the handover request signaling, wherein the handover request message includes the information of the scanned carrier, wherein the information of the scanned carrier includes, but not limited to, the following parameters: the number of the scanned carriers, an identifier of the scanned carrier, a frequency of the scanned carrier and a bandwidth of the scanned carrier.

The technical solution of method embodiment 2 of the present invention is illustrated below in combination with specific examples.

Example 5

Figure 7:
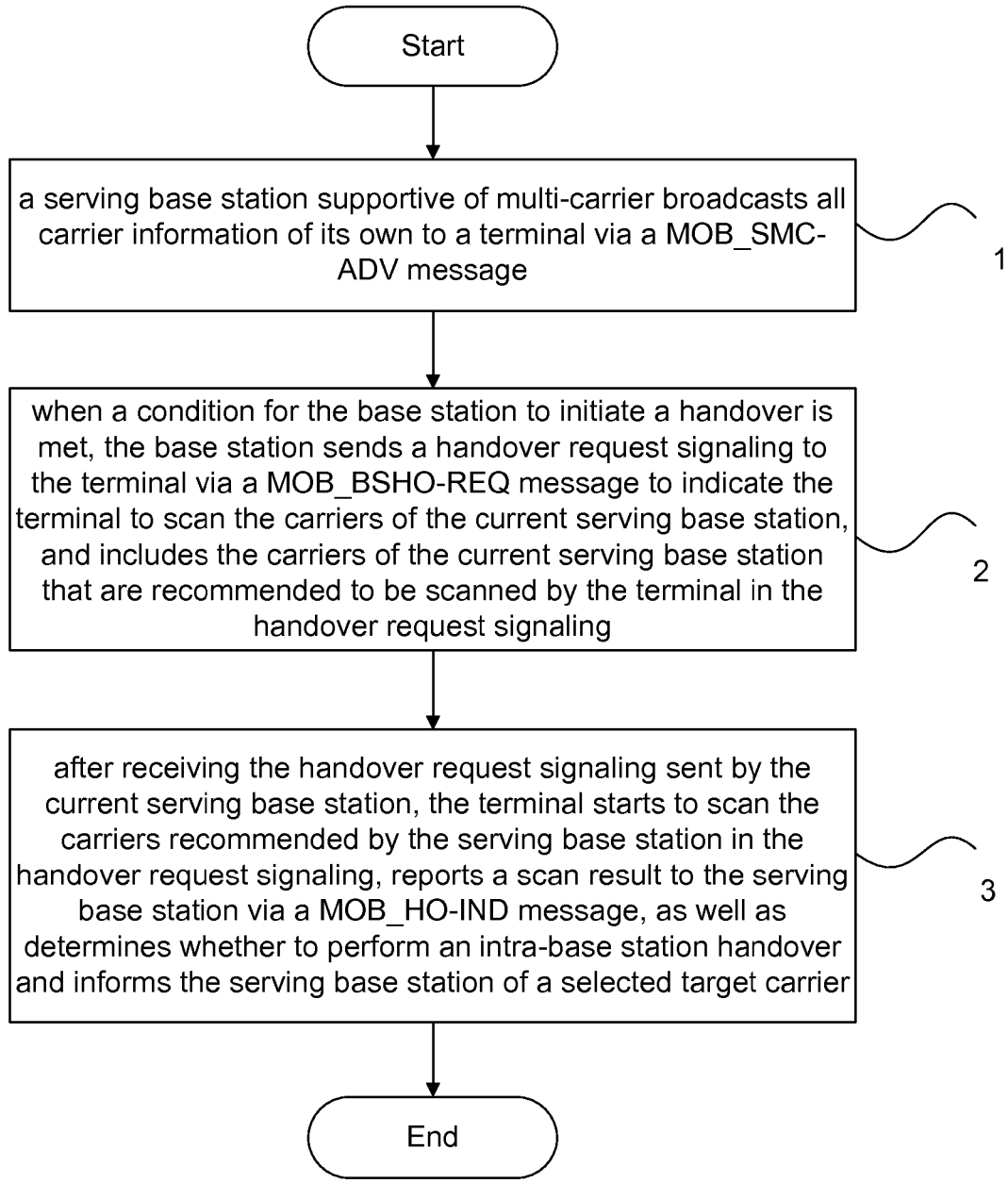
FIG. 7 is a flow chart of example 5 according to the method embodiment of the present invention.

In this example, carrier information of a serving base station (that is, all carrier information of the base station) is broadcasted to a terminal by the serving base station via a MOB_SMC-ADV message, a handover request signaling is sent by the serving base station to the terminal via a MOB_B-SHO-REQ message, and a scan response message is sent by the terminal to the serving base station via a MOB_HO-IND message. FIG. 7 is a flow chart of example 5 according to the method embodiment 2 of the present invention, as show in FIG. 7, the method comprises the following processing.

1, a serving base station supportive of multi-carrier broadcasts all carrier information of its own to a terminal. Specifically, the multi-carrier information of the serving base station may be included in a MOB_SMC-ADV message which is a new system message related to information of the carriers in the base station and can be broadcasted by the serving base station to the terminals in the serving areas of the serving base station via a broadcast channel. As shown in Table 1, the multi-carrier information in this message includes, but not limited to, the following parameters: the number of the carriers contained in a multi-carrier cell, a carrier identifier (SCID), a carrier frequency (SCF) and a carrier bandwidth (SCB). Moreover, the following parameters should be added in the MOB_SMC-ADV message: 1, the number of the multi-carriers of the current serving base station (N_SCARRIERS); 2, a flag indicating whether a carrier is a fully-configured carrier (SFC flag); and 3, the number of the fully-configured carriers of the current serving base station (N_SFCARRIERS).

2, when a condition for the base station to initiate a handover is met, the base station sends a handover request signaling to the terminal to indicate the terminal to scan the carriers in the current serving base station, and includes the carriers of the current serving base station that are recommended to be scanned by the terminal in the handover request signaling (corresponding to S602 shown in FIG. 6). Specifically, when desiring to send a handover request signaling to the terminal, the serving base station may include the handover request signaling in a MOB_BSHO-REQ message which is sent via a Basic CID. Table 11 shows the format of the MOB_BSHO-REQ message supportive of multi-carrier, as shown in this Table, the following parameters is added in this message: 1, the number of the carriers currently existing in the serving base station (N_current_SMC); 2, a temporary ID of the carrier currently existing in the serving base station (TEMP_SMCID); 3, a temporary safety association identifier (SAID) of the carrier currently existing in the serving base station (TEMP-SMCSAID); and 4, a temporary ID of the current serving carrier of the serving base station (TEMP_SMC ID_Anchor).

TABLE 11

| Syntax | Size (bit) | Notes |
| --- | --- | --- |
| MOB_BSHO-REQ_Message_format( ){ | — | — |
| Mode | 3 | 0b111: intra-base station handover |
| ... | ... | ... |
| else if (Mode == 0b110) { | 8 | — |
| ... | ... | ... |
| AK Change Indicator | 1 | |
| } | | |
| else if (Mode == 0b111) { | | |
| N_current_SMC | 3 | |
| for (i = 0; i < N_current_BSs; i++){ | — | — |
| TEMP_SMCID | 8 | |
| TEMP_SMCSAID | 8 | |
| } | — | — |
| TEMP_SMCID_Anchor | 3 | |
| AK Change Indicator | 1 | |
| } | — | — |
| Action time | 8 | |
| ... | ... | ... |
| TLV encoded information | variable | |
| } | — | — |

3, after receiving the handover request signaling sent by the current serving base station, the terminal starts to scan other carriers recommended by the serving base station in the handover request signaling, reports a scan result to the serving base station, as well as determines whether to perform an intra-base station handover and informs the serving base station of a selected target carrier (corresponding to S604 shown in FIG. 6).

Specifically, after scanning the recommended carriers in the serving base station, the terminal includes related configuration information of the recommended carriers, a determination on whether to perform an intra-base station handover and the selected target carrier information in a MOB_HO-IND message, and the message is sent to the serving base station via a BASIC CID. Table 12 shows the format of the MOB_HO-IND message supportive of multi-carrier, and as shown in Table 12, the following parameters is added in this message: 1, the number of the other carriers of the serving base station except the serving carrier (N_SMCs); 2, a temporary ID of the current serving carrier of the serving base station (Anchor SFCID); 3, temporary IDs of other carriers of the serving base station except the serving carrier (TEMP_SMCID); and 4, an indicating type of an intra-base station handover (Intra-BS_IND_Type).

TABLE 12

| Syntax | Size (bit) | Notes |
| --- | --- | --- |
| MOB_HO-IND_Message_format( ){ | — | — |
| Mode | 2 | 0b11: intra-base station handover |
| ... | ... | ... |
| else if (Mode == 0b10) { | 8 | — |
| ... | ... | ... |
| Action time | 8 | |
| } | — | — |
| } | — | — |
| else if (Mode == 0b11) { | | |
| Intra-BS_IND_Type | 2 | 0b00: perform an intra-base station handover; 0b01: cancel an intra-base station handover; 0b10: decline an intra-base station handover; 0b11: reserved. |
| if (Intra-BS_IND_Type == 0b00) { | — | — |
| Anchor SFCID | 3 | |
| N_SMCs | 3 | |
| for (i = 0; i < N_SMCs; i++) | — | — |
| { | | |
| TEMP_SMCID | 8 | |
| } | — | — |
| } | — | — |
| } | — | — |
| Padding | variable | — |
| TLV encoded information | variable | — |
| } | — | — |

Through the processing above, when the serving base station initiatively sends a handover request signaling to the terminal, the terminal can return a scan response message to the base station via the MOB_HO-IND message.

Example 6

Figure 8:
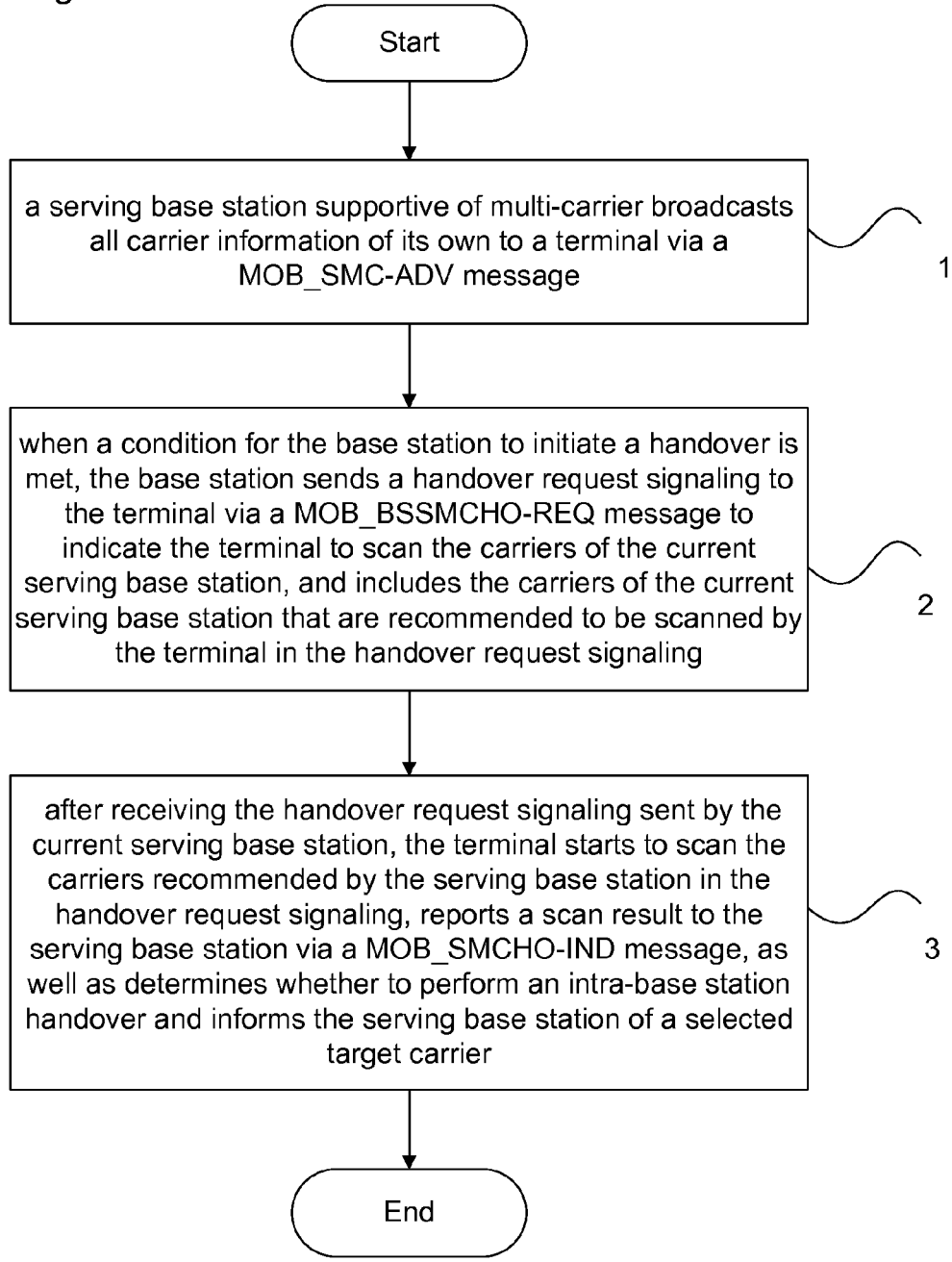
FIG. 8 is a flow chart of example 6 according to the method embodiment of the present invention.

In this example, carrier information of a serving base station (that is, all carrier information of the base station) is broadcasted to a terminal by the serving base station via a MOB_SMC-ADV message, a handover request is sent by the serving base station to the terminal via a MOB_BSSMCHO-REQ message, and a scan response message is sent by the terminal to the serving base station via a MOB_SMCHO-IND message. FIG. 8 is a flow chart of example 6 according to the method embodiment 2 of the present invention, as show in FIG. 8, the method comprises the following processing.

1, a serving base station supportive of multi-carrier broadcasts all carrier information of its own to a terminal. Specifically, the multi-carrier information of the serving base station may be included in a MOB_SMC-ADV message which is a new system message related to information of the carriers in the serving base station and can be broadcasted by the serving base station to the terminals in the serving areas of the serving base station via a broadcast channel. As shown in Table 1, the multi-carrier information in this message includes, but not limited to, the following parameters: the number of the carriers contained in a multi-carrier cell, a carrier identifier (SCID), a carrier frequency (SCF) and a carrier bandwidth (SCB). Moreover, the following parameters should be added in the MOB_SMC-ADV message: 1, the number of the multi-carriers of the current serving base station (N_SCARRIERS); 2, a flag indicating whether a carrier is a fully-configured carrier (SFC flag); and 3, the number of the fully-configured carriers of the current serving base station (N_SFCARRIERS).

2, when a condition for the base station to initiate a handover is met, the base station sends a handover request signaling to the terminal to indicate the terminal to scan the carriers of the current serving base station, and includes the carriers of the current serving base station that are recommended to be scanned by the terminal in the handover request signaling. Specifically, when desiring to send a handover request signaling to the terminal, the serving base station may include the handover request signaling in a new MOB_B-SSMCHO-REQ message which is sent via a Basic CID. Table 13 shows the format of the MOB_BSHO-REQ message supportive of multi-carrier, as shown in Table 13, the following parameters is added in this message: 1, the number of the carriers currently existing in the serving base station (N_current_SMC); 2, a temporary ID of the carrier currently existing in the serving base station (TEMP_SMCID); 3, a temporary safety association identifier (SAID) of the carrier currently existing in the serving base station (TEMP-SMCSAID); and 4, a temporary ID of the current serving carrier existing in the serving base station (TEMP_SMC ID_Anchor).

TABLE 13

| Syntax | Size (bit) | Notes |
|---|---|---|
| MOB_BSSMCHO-REQ_Message_format( ){ | — | — |
| Mode | 1 | 0: non-intra-base station handover; 1: intra-base station handover. |
| if (Mode == 1) { | | |
| N_current_SMC | 3 | |
| for (i = 0; i < N_current_BSs; i++){ | — | — |
| TEMP_SMCID | 8 | |
| TEMP_SMCSAID | 8 | |
| } | — | — |
| TEMP_SMCID_Anchor | 3 | |
| AK Change Indicator | 1 | |
| } | — | — |
| Action time | 8 | |
| ... | ... | ... |
| TLV encoded information | variable | |
| } | — | — |

3, after receiving the handover request signaling sent by the current serving base station, the terminal starts to scan the carriers recommended by the serving base station in the handover request signaling, reports a scan result to the serving base station, as well as determines whether to perform an intra-base station handover and informs the serving base station of a selected target carrier.

Specifically, after scanning the carriers in the serving base station, the terminal includes related configuration information of the carriers, a determination on whether to perform an intra-base station handover and the selected target carrier in a new MOB_SMCHO-IND message which is sent to the serving base station via a BASIC CID. Table 14 shows the format of the MOB_SMCHO-IND message supportive of multi-carrier, as shown in Table 14, the following parameters is set in this message: 1, the number of the other carriers of the serving base station except the serving carrier (N_SMCs); 2, a temporary ID of the current serving carrier of the serving base station (Anchor SFCID); 3, temporary IDs of other carriers of the serving base station except the serving carrier (TEMP_SMCID); and 4, an indicating type of an intra-base station handover (Intra-BS_IND_Type).

TABLE 14

| Syntax | Size (bit) | Notes |
|---|---|---|
| MOB_SMCHO-IND_Message_format( ){ | — | — |
| Mode | 1 | 0: non-intra-base station handover; 1: intra-base station handover. |
| if (Mode == 1) { | | |
| Intra-BS_IND_Type | 2 | 0b00: perform an intra-base station handover; 0b01: cancel an intra-base station handover; 0b10: decline an intra-base station handover; 0b11: reserved. |
| if (Intra-BS_IND_Type == 0b00) { | — | — |
| Anchor SFCID | 3 | |
| N_SMCs | 3 | |
| for (i = 0; i < N_SMCs; i++) { | — | — |
| TEMP_SMCID | 8 | |
| } | — | — |
| } | — | — |
| } | — | — |
| Padding | variable | — |
| TLV encoded information | variable | — |
| } | — | — |

Through the processing above, when the serving base station initiatively sends a handover request signaling to the terminal, the terminal can return a scan response message to the serving base station via the MOB_SMCHO-IND message.

Example 7

Figure 9:
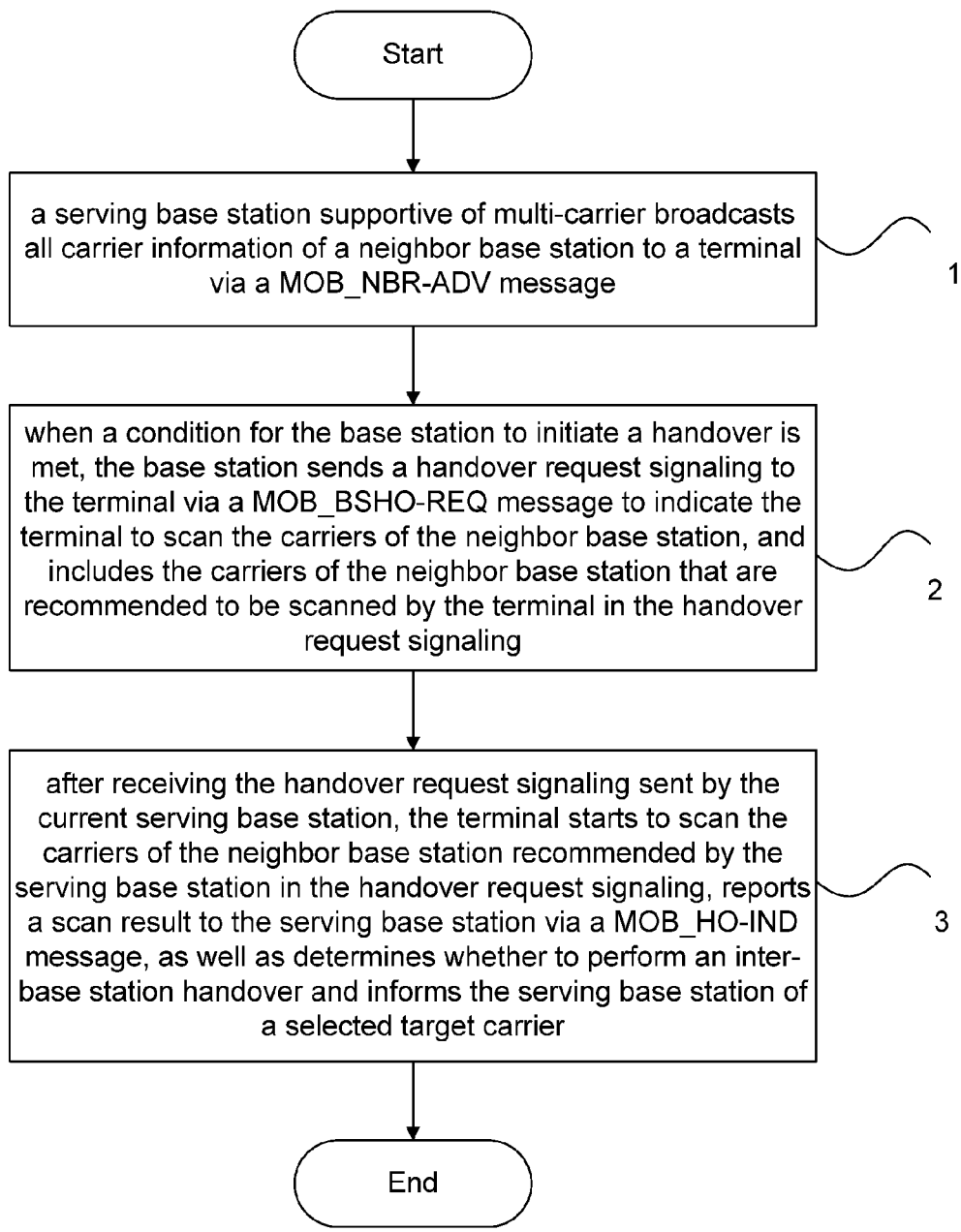
FIG. 9 is a flow chart of example 7 according to the method embodiment of the present invention.

In this example, carrier information of a neighbor serving base station (that is, all carrier information of the base station) is broadcasted to a terminal by a serving base station via a MOB_NBR-ADV message, a handover request signaling is sent by the base station to the terminal via a MOB_BSHO-REQ message, and a scan response message is sent by the terminal to the base station via a MOB_HO-IND message. FIG. 9 is a flow chart of example 7 according to the method embodiment 2 of the present invention, as show in FIG. 9, the method comprises the following processing.

1, a serving base station supportive of multi-carrier broadcasts all carrier information of a neighbor base station (i.e. the aforementioned multi-carrier information) to a terminal. Specifically, the multi-carrier information of the neighbor base station may be included in an MOB_NBR-ADV message. Table 6 shows the format of the MOB_NBR-ADV message supportive of multi-carrier, and as shown in Table 6, the multi-carrier information in this message includes, but not limited to, the following parameters: an identifier of the neighbor base station, a leading index/sub-channel index, an indicator indicating whether an address is shared, a time and frequency synchronization indicator, whether a carrier is a fully-configured carrier, the number of the carriers contained in a multi-carrier cell, a carrier identifier (SCID), a carrier frequency (SCF), a carrier bandwidth (SCB) and the like.

2, when a condition for the base station to initiate a handover is met, the base station sends a handover request signaling to the terminal to indicate the terminal to scan the carriers in the neighbor base station, and includes the carriers of the neighbor base station that are recommended to be scanned by the terminal in the handover request signaling (corresponding to S602 shown in FIG. 6). Specifically, when desiring to send a handover request signaling to the terminal, the serving base station may include the handover request signaling in a MOB_BSHO-REQ message which is sent via a Basic CID. Table 15 shows the format of the MOB_BSHO-REQ message supportive of multi-carrier, and as shown in Table 15, the following parameters is added in this message: 1, the number of the carriers currently existing in the neighbor base station (N_current_SMC); 2, a temporary ID of the carrier currently existing in the neighbor base station (TEMP_SMCID); 3, a temporary safety association identifier (SAID) of the carrier currently existing in the neighbor base station (TEMP-SMCSAID); and 4, a temporary ID of the carrier of the neighbor base station (TEMP_SMC ID_Anchor).

TABLE 15

| Syntax | Size (bit) | Notes |
|---|---|---|
| MOB_BSHO-REQ_Message_format( ){ | — | — |
| Mode | 3 | 0b111: inter-base station handover |
| ... | ... | ... |
| else if (Mode == 0b110) { | 8 | — |
| ... | ... | ... |
| AK Change Indicator | 1 | — |
| } | | |
| else if (Mode == 0b111) { | | |
| N_current_SMC | 3 | — |
| for (i = 0; i < N_current_BSs; i++){ | — | — |
| TEMP_SMCID | 8 | — |
| TEMP_SMCSAID | 8 | — |
| } | — | — |
| TEMP_SMCID_Anchor | 3 | — |
| AK Change Indicator | 1 | — |
| } | — | — |
| Action time | 8 | — |
| ... | ... | ... |
| TLV encoded information | variable | — |
| } | — | — |

3, after receiving the handover request signaling sent by the current serving base station, the terminal starts to scan the carriers of the neighbor base station recommended by the serving base station in the handover request signaling, reports a scan result to the serving base station, as well as determines whether to perform an inter-base station handover and informs the serving base station of a selected target carrier (corresponding to S604 shown in FIG. 6).

Specifically, after scanning the recommended carriers of the neighbor base station, the terminal includes related configuration information of the recommended carriers, a determination on whether to perform an inter-base station handover and the selected target carrier information in a MOB_HO-IND message which is sent to the serving base station via a BASIC CID. Table 16 shows the format of the MOB_HO-IND message supportive of multi-carrier, and as shown in Table 16, the following parameters is further added in this message: 1, the number of the carriers of the neighbor base station (N_SMCs); 2, a temporary ID of the target carrier of the neighbor base station (Anchor SFCID); 3, temporary IDs of other carriers of the neighbor base station (TEMP_SMCID); and 4, an indicating type of an inter-base station handover (Inter-BS_IND_Type).

TABLE 16

| Syntax | Size (bit) | Notes |
|---|---|---|
| MOB_HO-IND_Message_format( ){ | — | — |
| Mode | 2 | 0b11: inter-base station handover |
| ... | ... | ... |
| else if (Mode == 0b10) { | 8 | — |
| ... | ... | ... |
| Action time | 8 | — |
| } | — | — |
| } | — | — |
| else if (Mode == 0b11) { | | |
| Inter-BS_IND_Type | 2 | 0b00: perform an inter-base station handover; 0b01: cancel an inter-base station handover; 0b10: decline an inter-base station handover; 0b11: reserved. |
| if (Inter-BS_IND_Type == 0b00) { | — | — |
| Anchor SFCID | 3 | |
| N_SMCs | 3 | |
| for (i = 0; i < N_SMCs; i++) { | — | — |
| TEMP_SMCID | 8 | |
| } | — | — |
| } | — | — |
| } | — | — |
| Padding | variable | — |
| TLV encoded information | variable | — |
| } | — | — |

Through the processing above, when the serving base station initiatively sends a handover request signaling to the terminal, the terminal can return a scan response message to the base station via the MOB_HO-IND message.

Example 8

Figure 10:
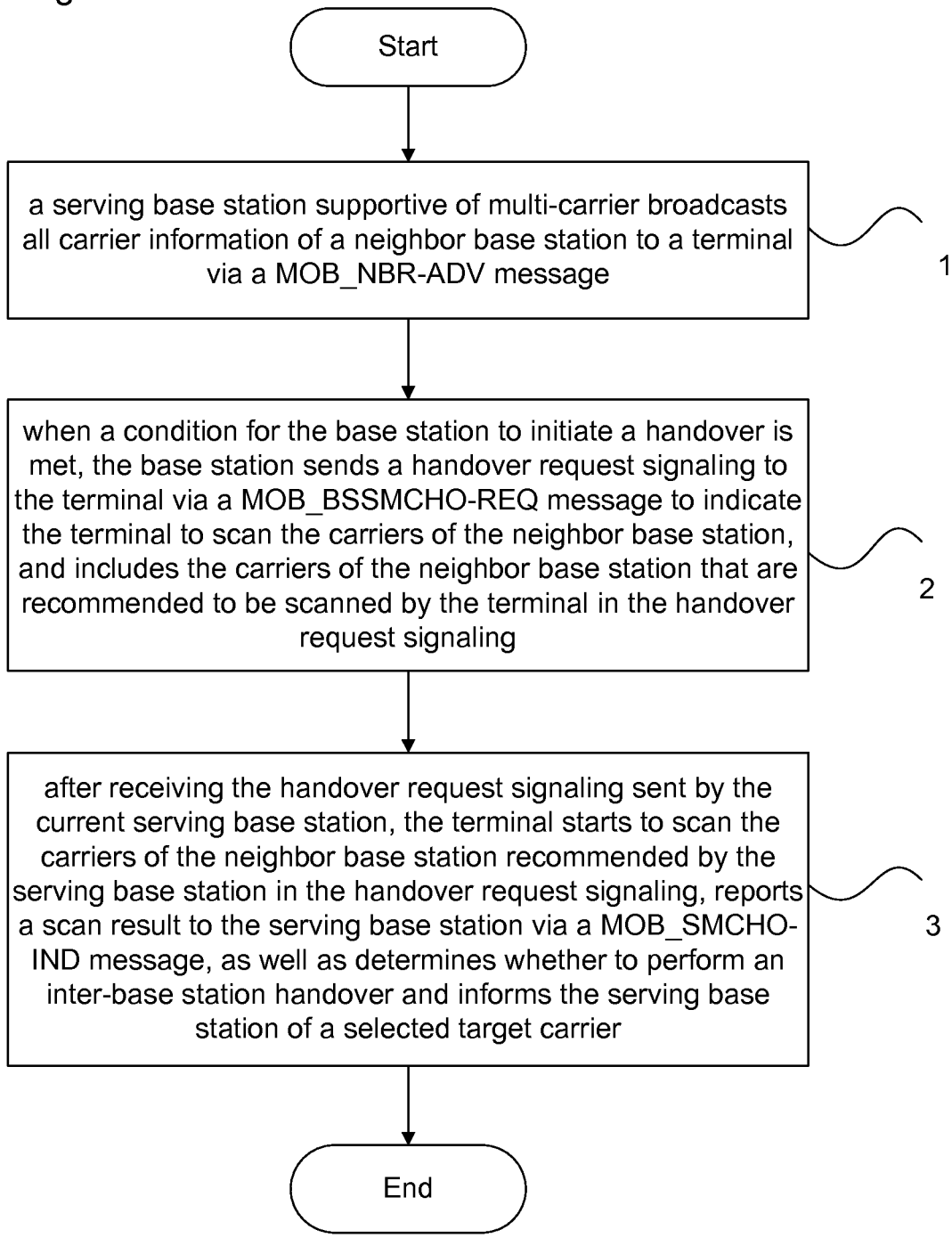
FIG. 10 is a flow chart of example 8 according to the method embodiment of the present invention.

In this example, carrier information of a neighbor serving base station (that is, all carrier information of the base station) is broadcasted to a terminal by a serving base station via a MOB_NBR-ADV message, a handover request signaling is sent by the serving base station to the terminal via a MOB_B-SSMCHO-REQ message, and a scan response message is sent by the terminal to the serving base station via a MOB_SMCHO-IND message. FIG. 10 is a flow chart of example 8 according to the method embodiment 2 of the present invention, as show in FIG. 10, the method comprises the following processing.

1, a serving base station supportive of multi-carrier broadcasts all carrier information of a neighbor base station (i.e. the aforementioned multi-carrier information) to a terminal. Specifically, the multi-carrier information of the neighbor base station may be included in a MOB_NBR-ADV message. Table 6 shows the format of the MOB_NBR-ADV message supportive of multi-carrier, and as shown in Table 6, the multi-carrier information in this message includes, but not limited to, the following parameters: an identifier of the neighbor base station, a leading index/sub-channel index; an indicator indicating whether an address is shared, a time and frequency synchronization indicator, whether a carrier is a fully-configured carrier, the number of the carriers contained in a multi-carrier cell, a carrier identifier (SCID), a carrier frequency (SCF), a carrier bandwidth (SCB) and the like.

2, when a condition for the base station to initiate a handover is met, the base station sends a handover request signaling to the terminal to indicate the terminal to scan the carriers of the neighbor base station, and includes the carriers of the neighbor base station that are recommended to be scanned by the terminal in the handover request signaling. Specifically, when desiring to send a handover request signaling to the terminal, the serving base station may include the handover request signaling in a new message MOB_B-SSMCHO-REQ which is sent via a Basic CID. Table 17 shows the format of the MOB_BSHO-REQ message supportive of multi-carrier, and as shown in Table 17, the following parameters is added in this message: 1, the number of the carriers currently existing in the neighbor base station (N_current_SMC); 2, a temporary ID of the carrier currently existing in the neighbor base station (TEMP_SMCID); 3, a temporary safety association identifier (SAID) of the carrier currently existing in the neighbor base station (TEMP-SMC-SAID); and 4, a temporary ID of the carrier of the neighbor base station (TEMP_SMC ID_Anchor).

TABLE 17

| Syntax | Size (bit) | Notes |
|---|---|---|
| MOB_BSSMCHO-REQ_Message_format( ){ | — | — |
| Mode | 1 | 0: non-inter-base station handover; 1: inter-base station handover. |
| if (Mode == 1) { | | |
| N_current_SMC | 3 | |
| for (i = 0; i < N_current_BSs; i++){ | — | — |
| TEMP_SMCID | 8 | |
| TEMP_SMCSAID | 8 | |
| } | — | — |
| TEMP_SMCID_Anchor | 3 | |
| AK Change Indicator | 1 | |
| } | — | — |
| Action time | 8 | |
| ... | ... | ... |
| TLV encoded information | variable | |
| } | — | — |

3, after receiving the handover request signaling sent by the current serving base station, the terminal starts to scan the carriers of the neighbor base station recommended by the serving base station in the handover request signaling, reports a scan result to the serving base station, as well as determines whether to perform an inter-base station handover and informs the serving base station of a selected target carrier.

Specifically, after scanning the carriers of the neighbor base station, the terminal includes related configuration information of the carriers, a determination on whether to perform an inter-base station handover and the selected target carrier in a new message MOB_SMCHO-IND which is sent to the serving base station via a BASIC CID. Table 18 shows the format of the MOB_SMCHO-IND message supportive of multi-carrier, and as shown in Table 18, the following parameters is set in this message: 1, the number of the other carriers of the neighbor base station except the target carrier (N_S-MCs); 2, a temporary ID of the target carrier of the neighbor base station (Anchor SFCID); 3, temporary IDs of other carriers of the neighbor base station except the target carrier (TEMP_SMCID); and 4, an indicating type of an inter-base station handover (Inter-BS_IND_Type).

TABLE 18

| Syntax | Size (bit) | Notes |
|---|---|---|
| MOB_SMCHO-IND_Message_format( ){ | — | — |
| Mode | 1 | 0: non-inter-base station handover; 1: inter-base station handover. |

TABLE 18-continued

| Syntax | Size (bit) | Notes |
|---|---|---|
| if (Mode == 1) { | | |
| Inter-BS_IND_Type | 2 | 0b00: perform an inter-base station handover; 0b01: cancel an inter-base station handover; 0b10: decline an inter-base station handover; 0b11: reserved. |
| if (Inter-BS_IND_Type == 0b00) { | — | — |
| Anchor SFCID | 3 | |
| N_SMCs | 3 | |
| for (i = 0; i < N_SMCs; i++) { | — | — |
| TEMP_SMCID | 8 | |
| } | — | — |
| } | — | — |
| } | — | — |
| Padding | variable | — |
| TLV encoded information | variable | — |
| } | — | — |

Through the processing above, when the serving base station initiatively sends a handover request signaling to the terminalb the terminal can return a scan response message to the serving base station via the MOB_SMCHO-IND message.

According to an embodiment of the present invention, there is further provided a computer-readable medium on which a computer-executable instruction is stored, wherein the computer-executable instruction is executed by a computer or a processor to carry out the processing of each step shown in FIG. 1 to FIG. 10, preferably, to carry out one or more of the aforementioned embodiments and examples.

Device Embodiment 1

Figure 11:
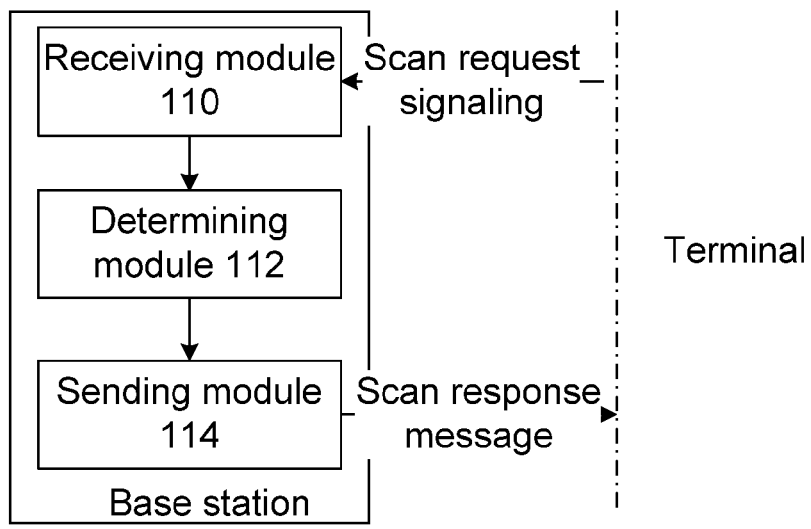
FIG. 11 is a block diagram of a base station according to device embodiment 1 of the present invention.

According to an embodiment of the present invention, a base station is provided, and FIG. 11 is a block diagram of a base station according to device embodiment 1 of the present invention; as shown in FIG. 11, the device comprises a receiving module 110, a determining module 112 and a sending module 114. Each of the aforementioned modules in the base station is described below.

Specifically, the receiving module 110 is used for receiving a scan request signaling sent by a terminal, after the receiving module 110 receives the scan request signaling, the determining module 112 connected to the receiving module 110 can determine whether the terminal can start to scan other carriers of a base station according to current state of the terminal (i.e. type of the service the terminal is engaged in) and/or scheduling algorithm used in the base station.

After determining that the terminal can start to scan other carriers of the base station, the determining module 112 further determines a recommended carrier the terminal needs to scan and sets configuration parameters of the recommended carrier, wherein the configuration parameters include, but not limited to the following information: an identifier, a frequency and a bandwidth of the recommended carrier. It should be noted that the carrier the terminal needs to scan may be a carrier of this base station or a carrier of a neighbor multi-carrier base station. Further, preferably the carrier the terminal needs to scan is a fully-configured carrier.

If the determining module 112 determines that the terminal can start to scan, the sending module 114 connected to the determining module 112 sends a scan response message to the terminal. Specifically, the sending module 114 needs to include the configuration parameters in the scan response message and sends it to the terminal, so that the terminal can perform a scan according to the configuration parameters. In practical application, in addition to the identifier, the frequency and the bandwidth information of the recommended carrier, the sending module 114 further includes the following information in the scan response message: whether or not a carrier corresponding to a carrier identifier carried in the scan request signaling is recommended and the number of the recommended carriers.

By means of the processing above, the base station can send a scan response message to the terminal.

Device Embodiment 2

Figure 12:
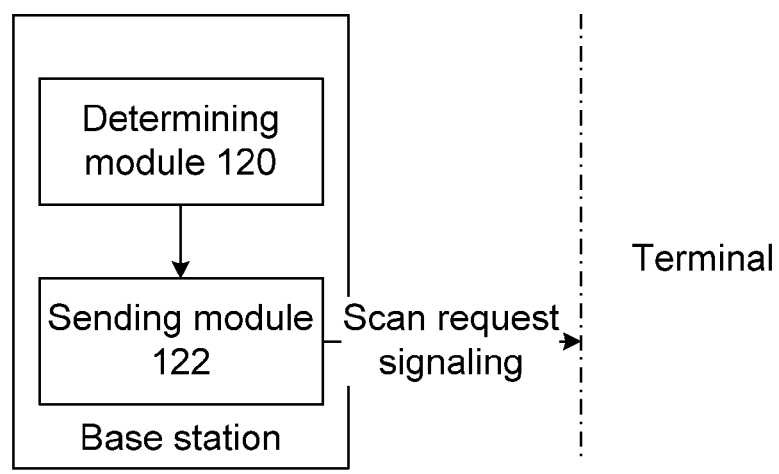
FIG. 12 is a block diagram of a base station according to device embodiment 2 of the present invention.

According to this embodiment, a base station is provided, and FIG. 12 is a block diagram of a base station according to device embodiment 2 of the present invention; as shown in FIG. 12, the device comprises a determining module 120 and a sending module 122. Each of the aforementioned modules in the base station is illustrated below.

Specifically, when a predetermined handover initiation condition is met, the determining module 120 determines a recommended carrier a terminal needs to scan and sets configuration parameters of the recommended carrier, wherein the configuration parameters include, but not limited to the following information: an identifier, a frequency and a bandwidth of the recommended carrier. It should be noted that the carrier the terminal needs to scan may be a carrier of this base station or a carrier of a neighbor multi-carrier base station. Further, preferably the carrier the terminal needs to scan is a fully-configured carrier.

After the determining module 120 determines the recommended carrier, the sending module 122 connected to the determining module 120 includes the information of the carrier the terminal needs to scan in a handover request signaling and sends it to the terminal, so that the terminal can scan the carrier needing to be scanned according to the handover request signaling.

It should be noted that the aforementioned modules can be variously modified and combined without departing from the scope set force by the appended claims.

As stated above, by means of the technical solution provided by the embodiments of the present invention, in a multi-carrier system, by setting a scan response message, when a terminal sends a scan request signaling to a base station, the base station can send a scan response message to the terminal, and when the base station initiatively sends a handover request signaling to the terminal, the terminal can scan the carrier needing to be scanned according to the handover request signaling.

In addition, as the present invention can be easily achieved without modifying the system architecture and existing processing flow, the present invention can be conveniently popularized in related technical fields and thus has relatively high industrial applicability.

Apparently, it should be understood by those skilled in this art that the modules or steps of the present invention can be realized by a universal computing device, centralized on a single computing device or distributed on a network consisting of multiple computing devices, and optionally realized by executable program codes of a computing device; the modules or steps can be therefore stored in a storage device to be executed by a computing device or separately manufactured into integrated circuit modules, or multiple modules or steps are manufactured into a single integrated circuit module. Thus, the present invention is not limited to any special combination of hardware and software.

The mentioned above is only preferred embodiments of the present invention but not limitation of the present invention, various modification and variations can be devised by those skilled in this art. Any modification, equivalent alteration and improvement devised without departing from the principle of the present invention belong to the protection scope of the present invention.

The invention claimed is:

1. A method for sending a scan response based on a multi-carrier system, comprising:
   a base station receiving a scan request signaling sent by a terminal; and
   responding to the scan request signaling, the base station determining a carrier the terminal needs to scan and sending a scan response message to the terminal;
   wherein a process that the base station determines a carrier the terminal needs to scan comprises:
      the base station determines the carrier the terminal needs to scan to be a carrier of the base station; or
      the base station determines the carrier the terminal needs to scan to be a carrier of a neighbor multi-carrier base station; and
   wherein the carrier the terminal needs to scan is a fully-configured carrier, the fully-configured carrier comprising synchronous channels and control channels information.

2. The method according to claim 1, after the base station determines the carrier the terminal needs to scan, the method further comprising:
   the base station setting configuration parameters of the carrier the terminal needs to scan, wherein the configuration parameters comprise at least one of: a carrier identifier, a carrier frequency and a carrier bandwidth; and
   the base station including the configuration parameters in the scan response message so that the terminal performs a scan according to the configuration parameters.

3. The method according to claim 1, wherein the scan response message further includes at least one of: whether or not a carrier corresponding to a carrier identifier carried in the scan request signaling is recommended, and a number of the recommended carriers.

4. A method for sending a scan response based on a multi-carrier system, comprising:
   a base station determining a carrier a terminal needs to scan and including information of the carrier the terminal needs to scan in a handover request signaling and sending it to the terminal; and
   the terminal scanning the carrier needing to be scanned according to the handover request signaling;
   wherein a process that the base station determines a carrier the terminal needs to scan comprises:
      the base station determines the carrier the terminal needs to scan to be a carrier of the base station; or
      the base station determines the carrier the terminal needs to scan to be a carrier of a neighbor multi-carrier base station; and
   wherein the carrier the terminal needs to scan is a fully-configured carrier, the fully-configured carrier comprising synchronous channels and control channels information.

5. A base station, comprising:
   a receiving module, used for receiving a scan request signaling sent by a terminal;

a determining module, used for determining a carrier the terminal needs to scan, wherein the carrier the terminal needs to scan is a carrier of a base station or a carrier of a neighbor multi-carrier base station, and the carrier the terminal needs to scan is a fully-configured carrier, the fully-configured carrier comprising synchronous channels and control channels information; and a sending module, used for sending a scan response message to the terminal after the determining module determines the carrier the terminal needs to scan.

6. A base station, comprising:

a determining module, used for determining a carrier a terminal needs to scan, wherein the carrier the terminal needs to scan is a carrier of a base station or a carrier of a neighbor multi-carrier base station, and the carrier the terminal needs to scan is a fully-configured carrier, the fully-configured carrier comprising synchronous channels and control channels information; and a sending module, used for including information of the carrier the terminal needs to scan in a handover request signaling and sending it to the terminal so that the terminal scans the carrier needing to be scanned according to the handover request signaling.

\* \* \* \* \*